(12) United States Patent
Nagahama

(10) Patent No.: US 7,734,759 B2
(45) Date of Patent: Jun. 8, 2010

(54) CROSS-CONNECT PROTECTION METHOD, NETWORK MANAGEMENT TERMINAL, AND NETWORK ELEMENT

(75) Inventor: Yuichi Nagahama, Richardson, TX (US)

(73) Assignee: Fujitsu Limited, Kawasaki (JP)

( * ) Notice: Subject to any disclaimer, the term of this patent is extended or adjusted under 35 U.S.C. 154(b) by 2343 days.

(21) Appl. No.: 10/237,226

(22) Filed: Sep. 5, 2002

(65) Prior Publication Data

US 2003/0012142 A1 Jan. 16, 2003

(51) Int. Cl.
*H04L 12/66* (2006.01)
*G06F 15/177* (2006.01)

(52) U.S. Cl. .................. 709/224; 709/223; 370/355

(58) Field of Classification Search ......... 709/223–224; 370/355
See application file for complete search history.

(56) References Cited

U.S. PATENT DOCUMENTS

2002/0071394 A1* 6/2002 Koziy et al. ................. 370/248

FOREIGN PATENT DOCUMENTS

| JP | 7-115461 | 5/1995 |
| JP | 08-161200 | 6/1996 |
| JP | 8-251159 | 9/1996 |
| JP | 11-98100 | 4/1999 |

* cited by examiner

*Primary Examiner*—Philip J Chea
(74) *Attorney, Agent, or Firm*—Katten Muchin Rosenman LLP

(57) ABSTRACT

The present invention is a cross-connect protection method that protects a cross-connect in a system where a plurality of network management terminals monitor a plurality of network elements constituting a network and the cross-connect at each of the network elements is controlled. An arbitrary one of the network management terminals instructs locking and unlocking of a cross-connect set in an arbitrary one of the network elements. The arbitrary network element controls the instructed locking and unlocking of the set cross-connect. Hence, when conducting a test, after locking a cross-connect set in an actual operation, a cross-connect of a testing network element is set/canceled for the test. Accordingly, it is possible to avoid erroneous cutting off of a signal used in the actual operation.

11 Claims, 27 Drawing Sheets

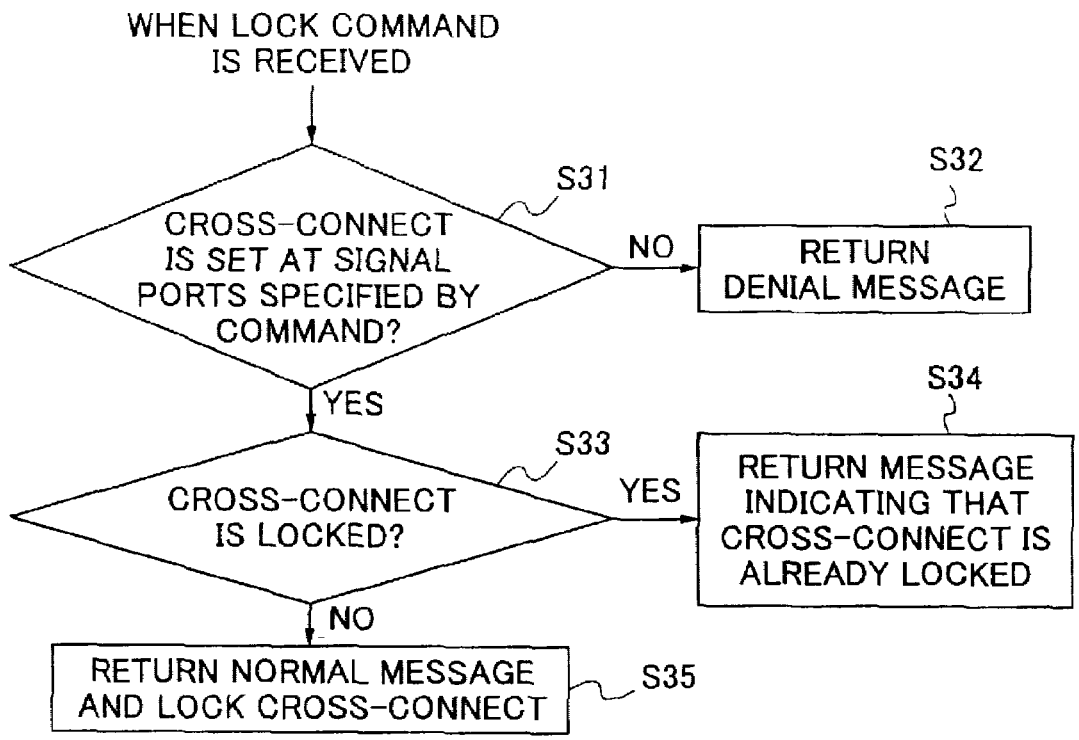
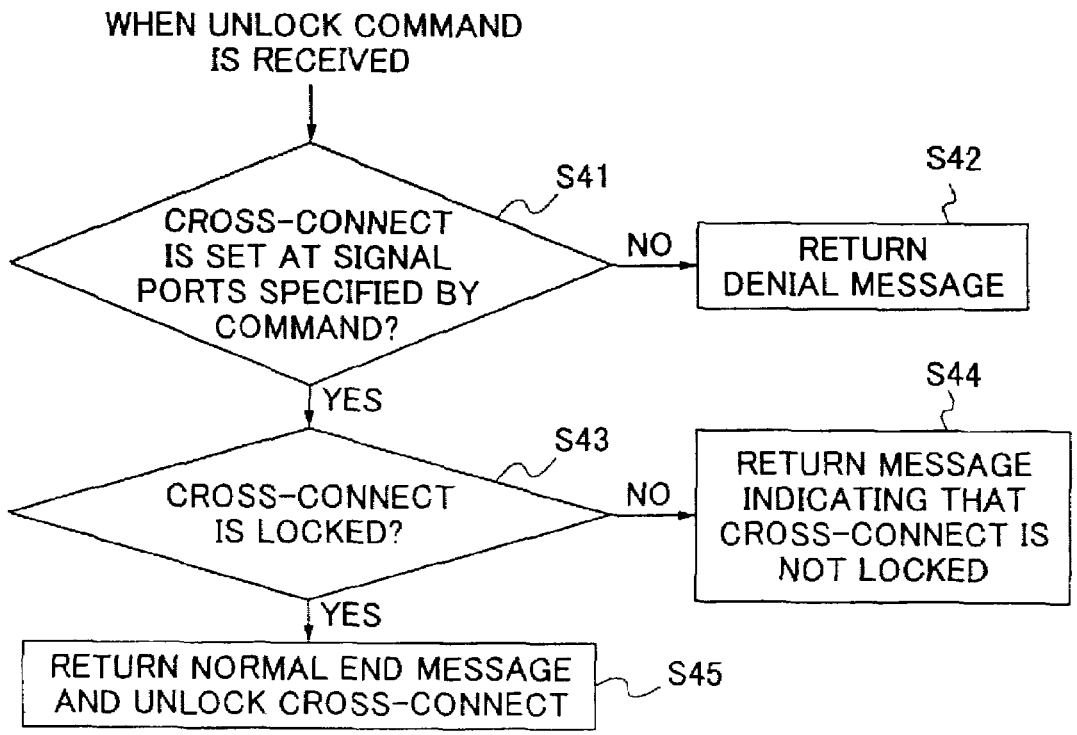

CROSS-CONNECT PROTECTION METHOD, NETWORK MANAGEMENT TERMINAL, AND NETWORK ELEMENT

TECHNICAL FIELD

The present invention relates to cross-connect protection methods, network management terminals and network elements, and more particularly to a cross-connect method, a network management terminal and a network element for a network having connected thereto a plurality of management terminals that control and manage cross-connects.

BACKGROUND ART

Conventionally, a terminal (hereinafter referred to as a "network management terminal") of a network management system (NMS) is connected to a network constituted by a plurality of network elements (NE), so as to control and manage cross-connects.

FIG. 1 is a system block diagram for explaining the NMS. In FIG. 1, a plurality of network elements 10a through 10e, such as switching equipments and network elements, are connected to constitute a network 12 such as a telecommunication network. Each of the network elements 10a through 10e is connected to a data communication network 14 such as a telecommunication management network (TMN). Network management terminals 16a through 16c and a maintenance terminal (workstation) 18 which is used as a kind of the network management terminal are connected to the data communication network 14.

FIG. 2 is a system block diagram of an example of a network including the NMS. In FIG. 2, the network has a structure such that high-speed network elements 20a through 20d having a transmission rate of 2.5 Gbps, for example, are connected in a ring by optical fiber transmission channels 21a through 21d. In addition, a medium-speed optical network element 20f having a transmission rate of 600 Mbps is connected to the network element 20b via an optical fiber transmission channel 21e, and a low-speed optical network element 20g having a transmission rate of 150 Mbps is connected to the network element 20c via an optical fiber transmission channel 21f. The transmission rate of 2.5 Gbps has a capacity to pass sixteen VC4 (Virtual Container 4) signals at 140 Mbps according to the ITU-T recommendations. The transmission rate of 600 Mbps can pass four VC4 signals, and the transmission rate of 150 Mbps can pass one VC4 signal. Accordingly, each of the network elements 20a through 20d sets a cross-connect so as to form a path for the VC4 signal.

For example, the network element 20a is provided in Osaka, and the network element 20c is provided in Tokyo. A maintenance terminal 22 and a network management terminal (NMS#1) 24 are connected to the network element 20a in Osaka. A network management terminal (NMS#2) 26 is connected to the network element 20c in Tokyo. Further, a network management terminal (NMS#3) 28 is connected to the network management terminal 26. In this case, the network management terminal 28 performs an operation by referring to a database of the network management terminal 26. In addition, as shown in FIG. 30, for example, in a network where the network elements 20a through 20d are connected in a ring, network elements 20g through 20j are connected in a ring, and the network elements 20c and 20g are connected, when network management apparatuses 24 and 25 are connected to the network elements 20b and 20i, respectively, and a network management terminal 27 is connected to the network management terminals 24 and 25, the network management terminal 27 centrally manages information (alarm information and cross-connect information) of the network management terminals 24 and 25, and issues an instruction to the network management terminals 24 and 25 so as to transmit commands.

In FIG. 2, the maintenance terminal 22 can be connected to a network element the maintenance terminal 22 intends to perform maintenance, and can set a cross-connect only with respect to this network element. On the other hand, the network management terminals 24, 26 and 28 can form a path from an arbitrary point in a network to another arbitrary point in the network via a plurality of network elements which are not limited to the network elements connected to the network management terminals 24, 26 and 28. For example, the network management terminals 24, 26 and 28 can form a path for the VC4 signal via the four network elements 20f, 20b, 20c and 20g. In this case, the network management terminals 24, 26 and 28 set cross-connects at each of the network elements 20f, 20b, 20c and 20g.

Conventionally, it is possible to set/cancel a cross-connect of an arbitrary network element from any network management terminal or maintenance terminal, as long as an NE user ID which is input to the network management terminal or maintenance terminal when operating a network element is equal to or higher than a predetermined security level, and at the same time, an NMS user ID has an authority to operate a cross-connect function.

For this reason, in a case where tests such as an operation check and a communication error check of a network element are conducted in parallel with an actual operation, there is a problem in that a signal used in the actual operation is erroneously cut off when a cross-connect of a testing network element is set/canceled from an arbitrary network management terminal.

DISCLOSURE OF THE INVENTION

It is a general object of the present invention to provide a cross-connect protection method, a network management terminal and a network element that can prevent a signal used in an actual operation from being erroneously cut off when setting/canceling a cross-connect in a case where the network element is tested in parallel with the actual operation.

In order to achieve the object, the present invention provides a cross-connect protection method that protects a cross-connect in a system where a plurality of network management terminals monitor a plurality of network elements constituting a network and the cross-connect at each of the network elements is controlled. An arbitrary one of the network management terminals instructs locking and unlocking of a cross-connect set in an arbitrary one of the network elements, and the arbitrary network element controls the instructed locking and unlocking of the cross-connect set therein.

According to such a cross-connect protection method, when a test is conducted, by locking a cross-connect that is set in an actual operation, thereafter setting/canceling a cross-connect in a testing network element for the test, and unlocking the cross-connect after the test, it is possible to prevent a signal used in the actual operation from being erroneously cut off.

BRIEF DESCRIPTION OF THE DRAWINGS

Other objects, features and advantages of the present invention will become more apparent from the following detailed description when read in conjunction with the accompanying drawings.

FIG. 8 is a flow chart of an embodiment of the process performed by the network element when receiving a lock command;

FIG. 9 is a flow chart of an embodiment of the process performed by the network element when receiving an unlock command;

BEST MODE FOR CARRYING OUT THE INVENTION

Figure 1:
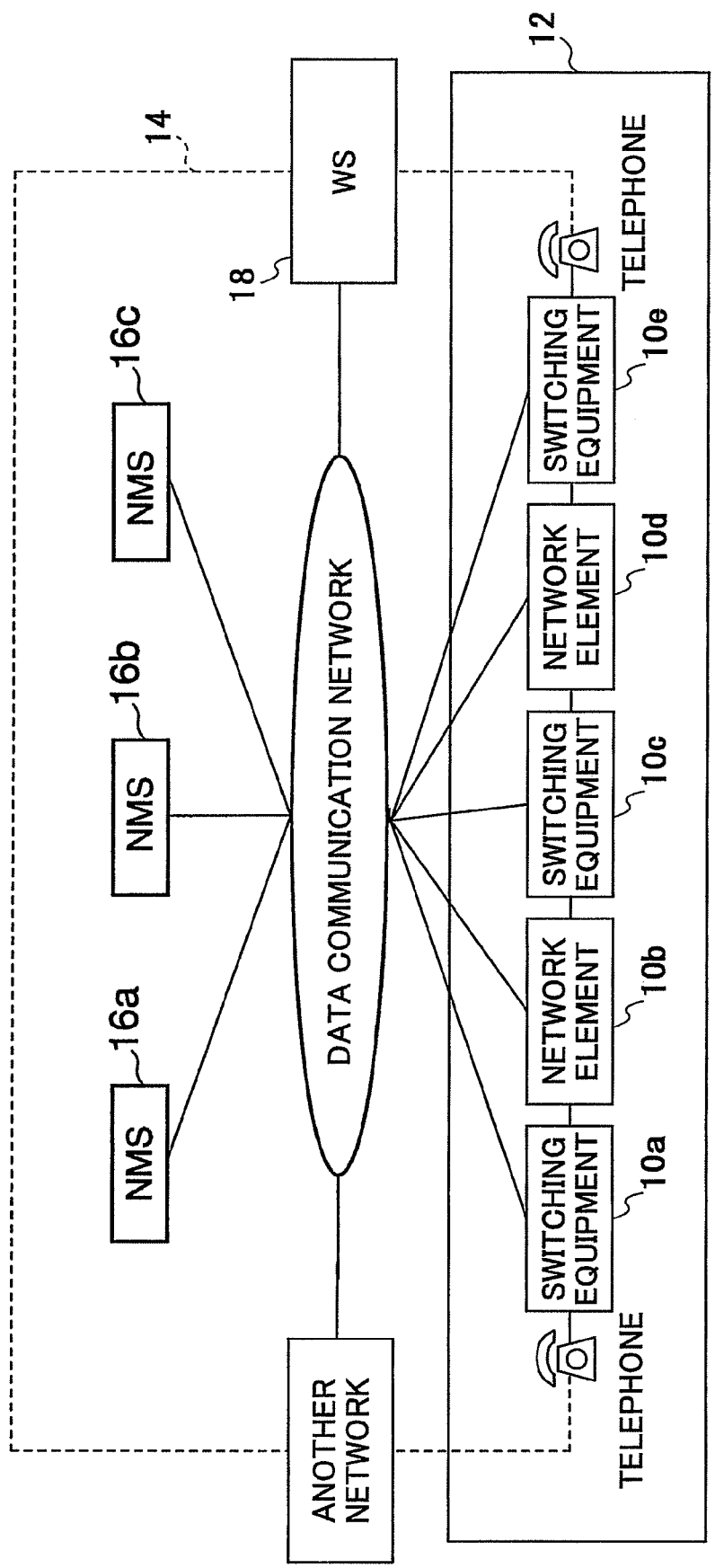
FIG. 1 is a system block diagram for explaining an NMS.

In the following, a description will be given of embodiments of the present invention, by referring to the drawings.

Figure 3:
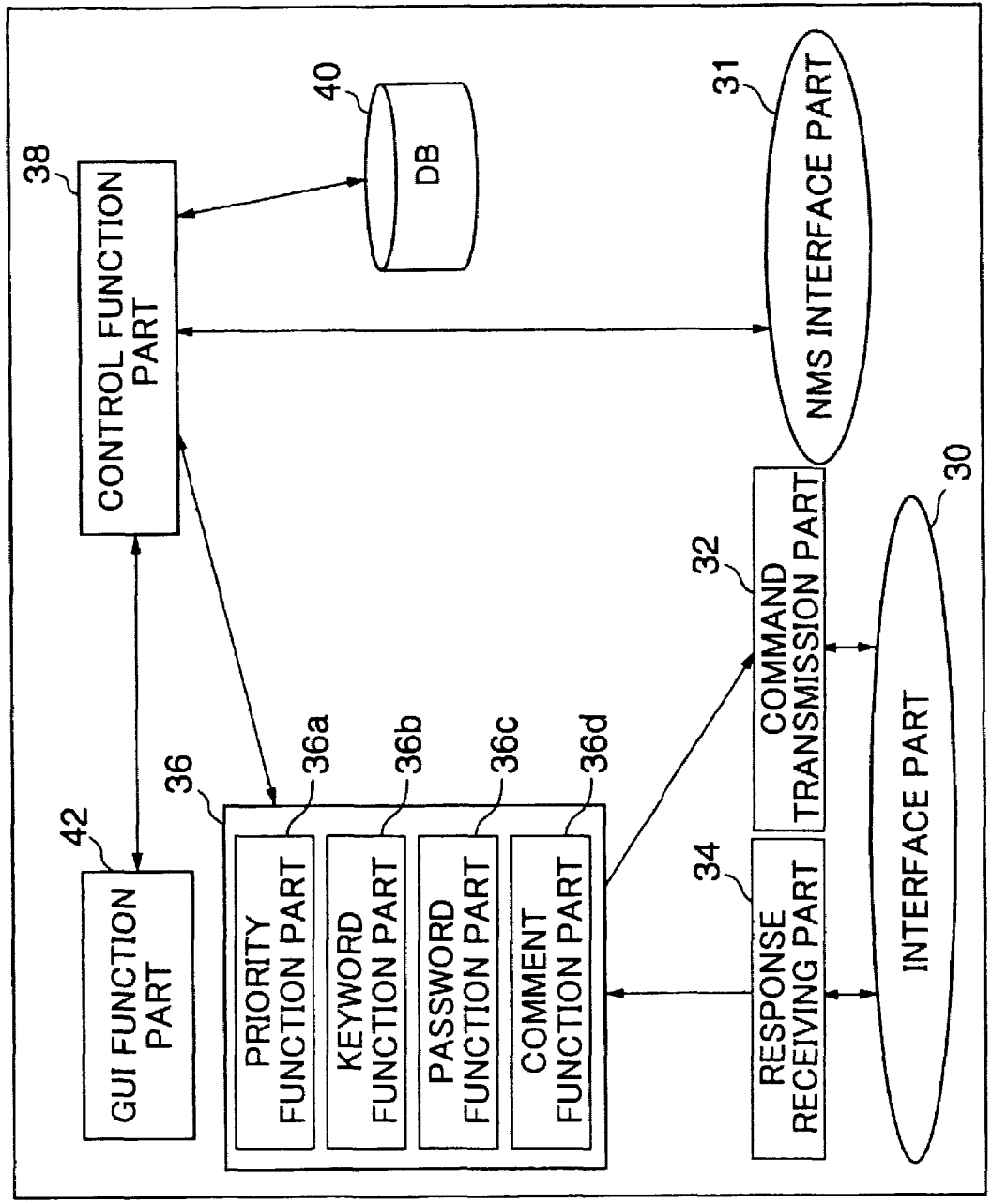
FIG. 3 is a functional block diagram of an embodiment of a network management terminal to which of the present invention is applied.

FIG. 3 is a functional block diagram of an embodiment of a network management terminal to which the method of the present invention is applied. In FIG. 3, an interface part 30 is connected to a network element via a transmission channel. A command transmission part 32 transmits a command to the network element via the interface part 30. A response receiving part 34 receives a response transmitted by the network element via the interface part 30, and supplies the response to a control function part 38 via a various function part 36. The various function part 36 is provided with a priority function part 36a, a keyword function part 36b, a password function part 36c and a comment function part 36d. The various function part 36 is connected to the control function part 38. In addition, an NMS interface part 31 is connected to another network management terminal via a signal channel, and connected to the control function part 38 inside the network management terminal.

Figure 2:
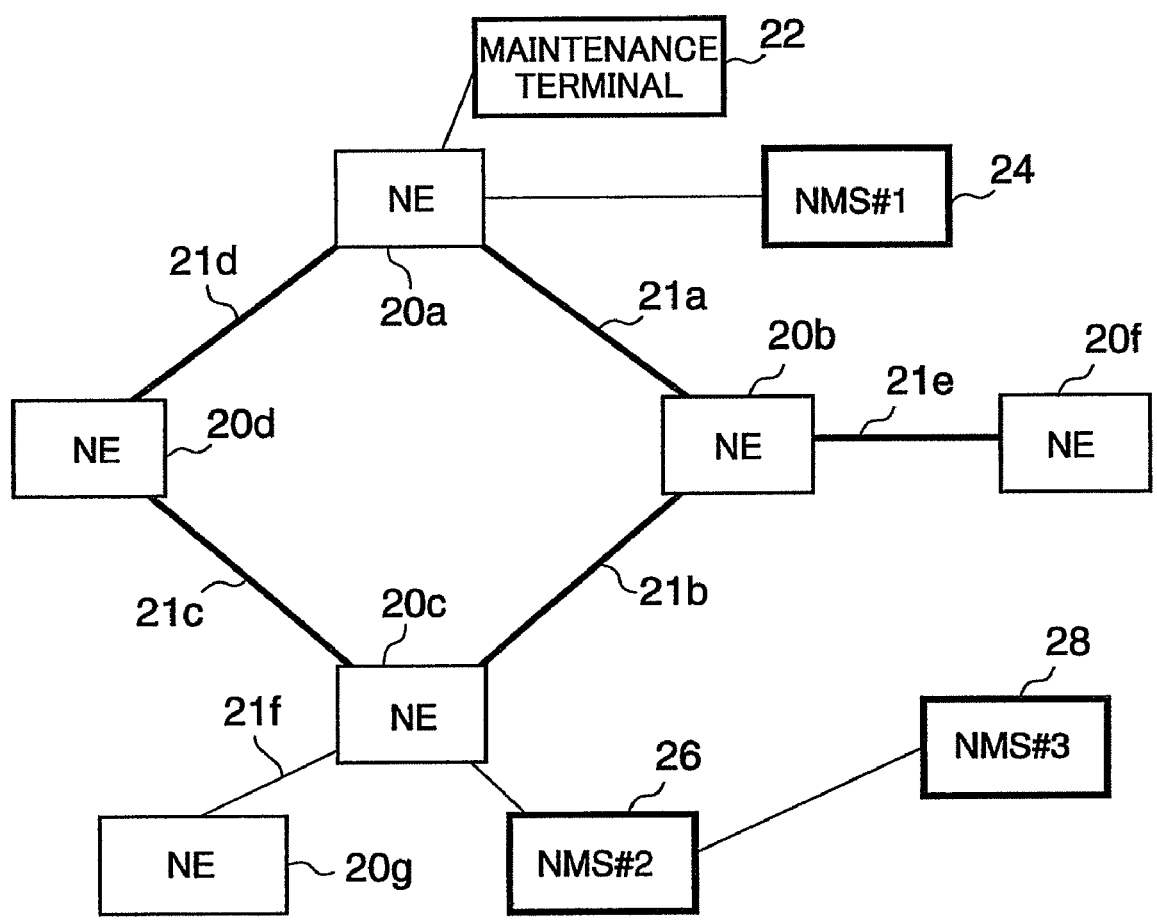
FIG. 2 is a system block diagram of an example of a network including the NMS.

The control function part 38 is connected to a database (DB) 40 and a GUI (Graphical User Interface) function part 42. The GUI function part 42 displays a set state of a signal of a selected network element, varies the display to reflect a click input on the display, and notifies the control function part 38 of the click input. Further, the network element is selected by making a display similarly to FIG. 2 and clicking a desired network element.

The control function part 38 controls the entire network management terminal. The control function part 38 generates a cross-connect command, a cross-connect undo command, a lock command, an unlock command and the like in response to the above-mentioned click input. These commands are supplied from the command transmission part 32 to a network element that is a control target via the various function part 36. The database 40 registers priority information, keyword information, password information, comment information and the like in addition to information related to the set state of each network element.

The priority function part 36a manages a priority given to a cross-connect. The keyword function part 36b manages a keyword added to the cross-connect. The password function part 36c manages a user name and a password added to the cross-connect. The comment function part 36d manages a comment added to the cross-connect. Further, a maintenance terminal is also a kind of the network management terminal, and has approximately the same structure as that of the network management terminal shown in FIG. 3.

Figure 4:
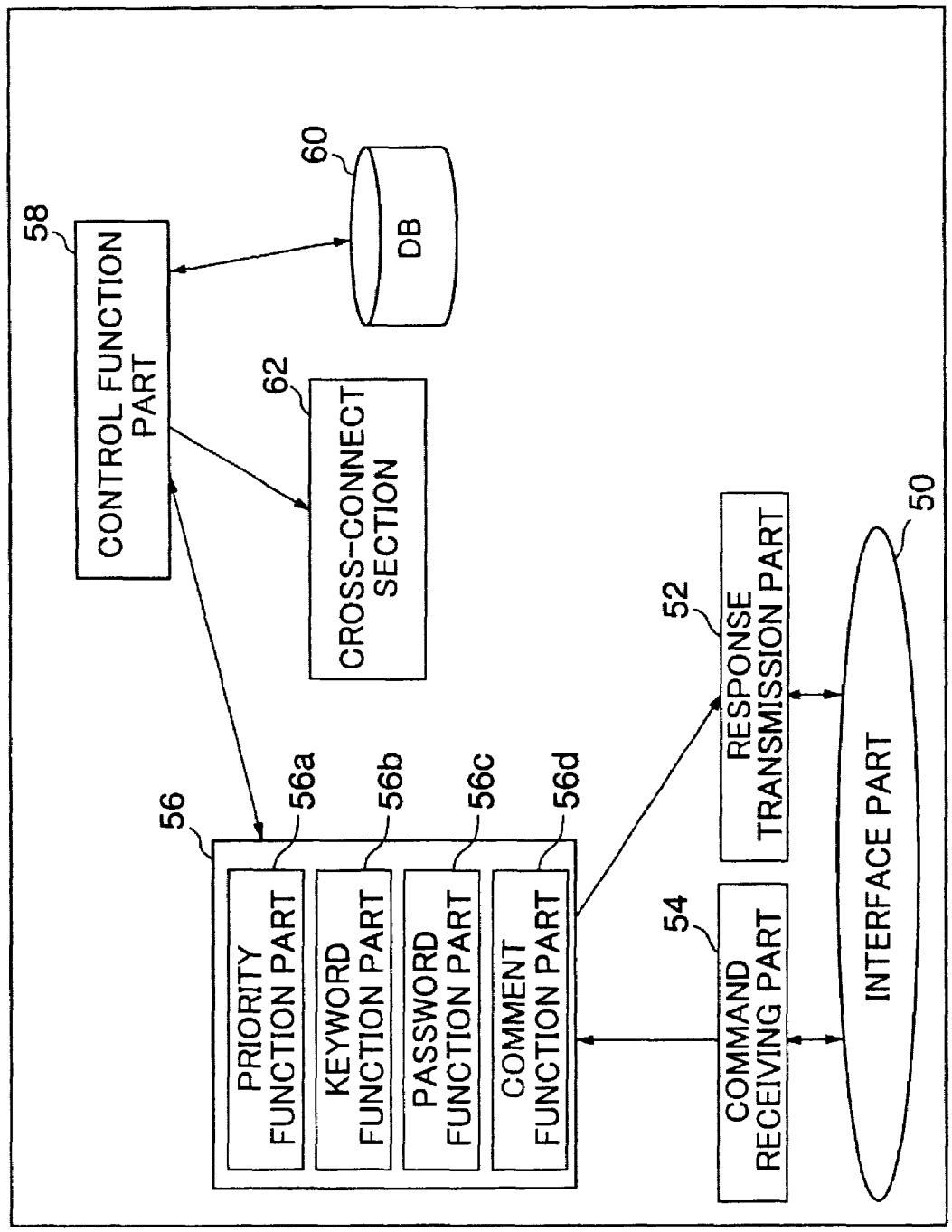
FIG. 4 is a functional block diagram of an embodiment of a network element to which the present invention is applied.

FIG. 4 is a functional block diagram of an embodiment of the network element to which the method of the present invention is applied. In FIG. 4, an interface part 50 is connected to a network management terminal via a transmission channel. A response transmission part 52 transmits a response to the network management terminal via the interface part 50. A command receiving part 54 receives a command transmitted by the network management terminal via the interface part 50. A various function part 56 is provided with a priority function part 56a, a keyword function part 56b, a password function part 56c and a comment function part 56d. The various function part 56 is connected to a control function part 58.

The control function part 58 is connected to a database (DB) 60 and a cross-connect section 62. The cross-connect section 62 sets a cross-connect according to a control by the control function part 58. The control function part 58 controls the entire network element. The control function part 58 controls the cross-connect section 62 according to a cross-connect command, a cross-connect undo command, a lock command, an unlock command or the like that is received, and transmits a result of the control from the response transmission part 52 to the network management terminal via the various function part 56. The database 60 registers priority information, keyword information, password information, comment information and the like in addition to information related to a set state of the cross-connect section 62. The priority function part 56a manages the priority given to the cross-connect. The keyword function part 56b manages a keyword added to the cross-connect. The password function part 56c manages a user name and a password added to the cross-connect. The comment function part 56d manages a comment added to the cross-connect.

Figure 5:
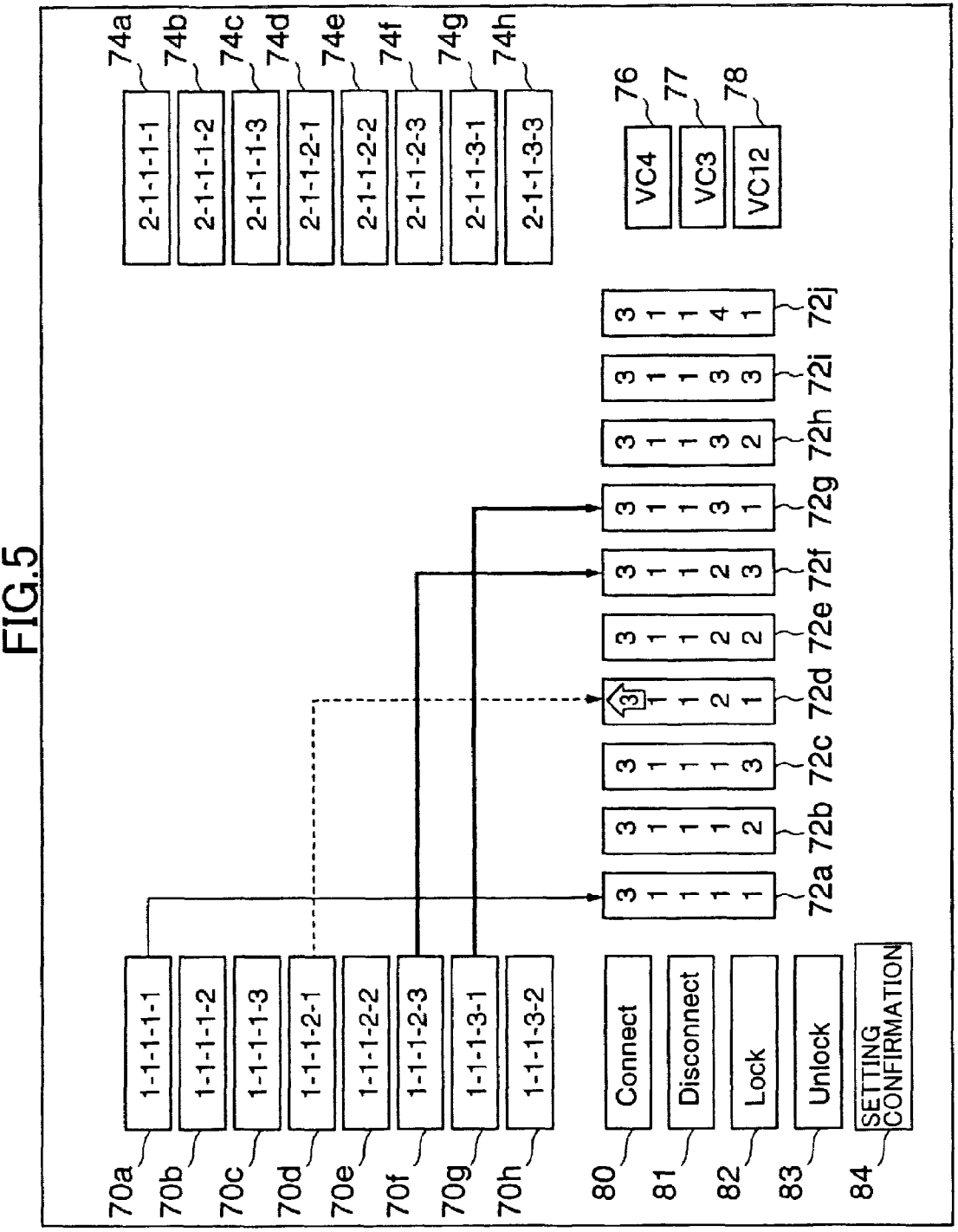
FIG. 5 is a diagram showing a first embodiment of a display made by a GUI function part 42 of the network management terminal.

FIG. 5 shows a first embodiment of a display made by the GUI function part 42 of the network management terminal. In FIG. 5, boxes 70a through 70h, 72a through 72j, 74a through 74h denote VC12 signal ports with a transmission rate of 2 Mbps, for example. In a case where the network element shown corresponds to the network element 20b shown in FIG. 2, the boxes 70a through 70h correspond to signals transmitted through the optical fiber transmission channel 21a, the boxes 72a through 72j correspond to signals transmitted through the optical fiber transmission channel 21e, and the boxes 74a through 74h correspond to signals transmitted through the optical fiber transmission channel 21b.

Here, the boxes of VC12 signals are displayed by clicking a button 78 among buttons 76, 77 and 78. However, when the button 76 is clicked, boxes of VC4 signals are displayed. When the button 77 is clicked, boxes of 2 Mbps VC3 signals are displayed.

The GUI function part 42 displays a connect button 80, a disconnect button 81, a lock button 82, an unlock button 83, and a setting confirmation button 84.

In this case, when the connect button 80 is clicked, the boxes that can be selected are displayed. When the boxes 70d and 72d among the selectable boxes are clicked and selected, a cross-connect of a VC12 signal port (1-1-1-2-1) of the box 70d of the optical fiber transmission channel 21a and a VC12 signal port (3-1-1-2-1) of the box 72d of the optical fiber transmission channel 21e is selected, and displayed by a broken line.

Hence, the control function part 38 of the network management terminal transmits a cross-connect command to the network element 20b. Thus, the network element 20b sets the cross-connect between the VC12 signal port (1-1-1-2-1) of the box 70d and the VC12 signal port (3-1-1-2-1) of box 72d. When the network management terminal receives a response from the network element 20b, the control function part 38 notifies the GUI function part 42 of the response. Hereby, the above-mentioned broken line is changed to and displayed as a continuous line similarly to the line connecting the boxes 70a and 72a. Additionally, information of the cross-connect between the boxes 70d and 72d is registered in the database 60.

In addition, when the disconnect button 81 is clicked, the boxes that can be selected are displayed. When the boxes 70a and 72a are clicked and selected from among the selectable boxes, the control function part 38 transmits a disconnect command to the network element 20b. The network element 20b performs disconnection of the boxes 70a and 72a. When a response is received from the network element 20b, the control function part 38 notifies the GUI function part 42 of the response, and the above-mentioned continuous line is deleted. In addition, when the setting confirmation button 84 is clicked and selected, the signal ports to which a cross-connect is set are displayed.

When a network element user ID is FUJITSU, a command that sets the cross-connect between the signal port (1-1-1-2-1) and the signal port (3-1-1-2-1) is, for example, as follows:
ENT-VC12:FUJITSU:1-1-1-2-1,3-1-1-2-1:CATG:::;.
A command that locks this cross-connect is as follows:
LOCK-VC12:FUJITSU:1-1-1-2-1,3-1-1-2-1:CATG:::;.
A command that unlocks this cross-connect is as follows:
UNLOCK-VC12:FUJITSU:1-1-1-2-1,3-1-1-2-1: CATG:::;.
A command that cancels this setting of the cross-connect is as follows:
DLT-VC12:FUJITSU:1-1-1-2-1,3-1-1-2-1:CATG:::;.
Additionally, a setting confirmation command issued in a state where a locked cross-connect exists and a response thereto are, for example, as follows:
RTRV-CRS-VC12:FUJITSU:,:CATG:::;
"1-1-1-2-1,3-1-1-2-1:::;"
"1-1-1-2-3,3-1-1-2-1:::LOCKED;"
"1-1-1-2-1,5-1-1-3-1:::LOCKED;"

Figure 6:
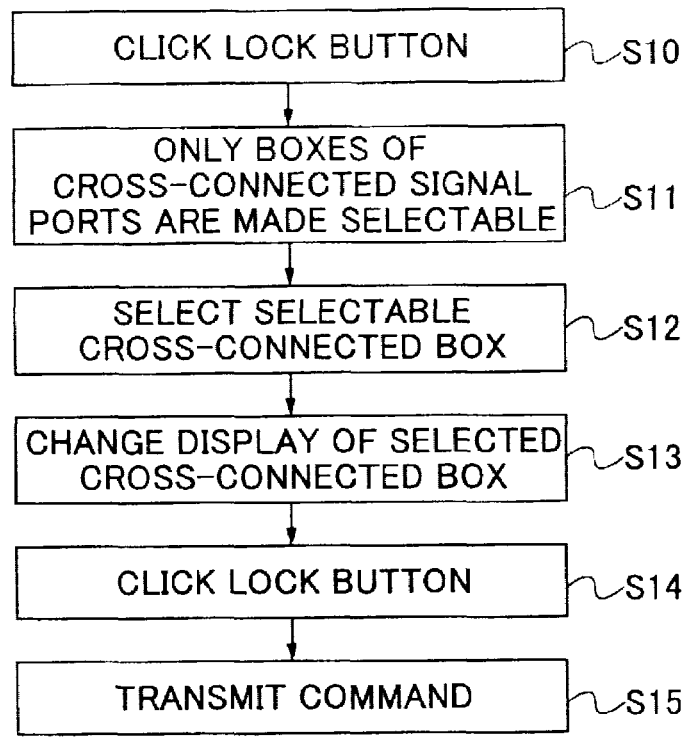
FIG. 6 is a flow chart of an embodiment of the process performed by the network management terminal when locking a cross-connect.

FIG. 6 is a flow chart for explaining an embodiment of the process performed by the network management terminal when locking a cross-connect. Here, the process will be explained for a case where the display shown in FIG. 5 is made, for example. In FIG. 6, when the lock button 82 is clicked in step S10, the control function part 38 makes only the boxes of the cross-connected signal ports selectable in step S11. Next, when selectable cross connected one of the boxes 70a and 72a is clicked and selected in step S12, the control function part 38 in step S13 changes, for example, the color of the display (broken line) of the cross-connected box so as to make a different display. Then, when the lock button 82 is clicked in step S14, the control function part 38 transmits a lock command to the network element 20b in step S15, and the network element 20b locks the cross-connect between the boxes 70a and 72a.

When a response from the network element 20b is received, the control function part 38 notifies the GUI function part 42 of the response and the GUI function part 42 changes the display of the above-mentioned broken line to a bold line similarly to a line connecting the boxes 70f and 72f or a line connecting the boxes 70g and 72g. Information related to the lock between the boxes 70a and 72a is registered in the database 60.

Figure 7:
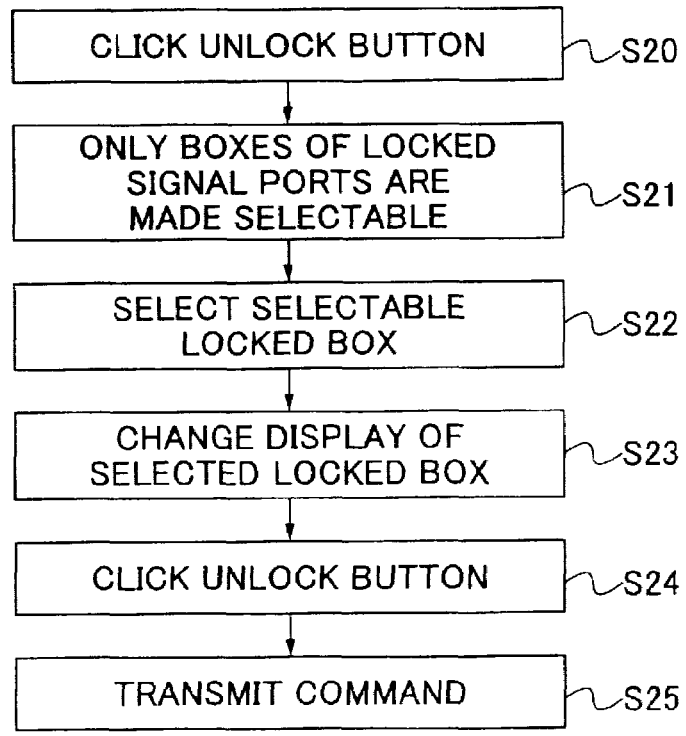
FIG. 7 is a flow chart of an embodiment of the process performed by the network management terminal when unlocking a cross-connect.

FIG. 7 is a flow chart for explaining an embodiment of the process performed by the network management terminal when unlocking a locked cross-connect. Here, the process will be explained for a case where the display shown in FIG. 5 is made, for example. In FIG. 7, when the unlock button 83 is clicked in step S20, the control function part 38 makes only the boxes of the locked signal ports selectable in step S21.

Next, when one of the selectable locked boxes 70f and 72f is clicked and selected in step S22, the control function part 38 changes, for example, the color of a display (bold line) of the locked box so as to make a different display. Then, when the unlock button 83 is clicked in step S24, the control function part 38 transmits an unlock command to the network element 20b in step S25, and the network element 20b unlocks the cross-connect between the boxes 70f and 72f.

When a response from the network element 20b is received, the control function part 38 notifies the GUI function part 42 of the response. Thereby, the GUI function part 42 changes the above-mentioned thick line to a normal continuous line and displays the normal continuous line thereof. Information of the unlock between the boxes 70f and 72f is registered in the database 60.

FIG. 8 is a flow chart for explaining an embodiment of the process performed by the network element when receiving a lock command. The process will be explained for the network element shown in FIG. 4, for example. In FIG. 8, when a lock command is received, the control function part 58 determines whether or not a cross-connect is set at signal ports specified by the command in step S31. This determination is made by searching cross-connect information that is registered in the database 60. When the cross-connect is not set, a denial message is created in step S32, and sent as a response to a network management terminal via the various function part 56 and the response transmission part 52.

When the cross-connect is set, step S33 determines whether or not the cross-connect that is specified by the command is locked. The determination is made by searching lock information registered in the database 60. When locked, step S34 creates a message indicating that the cross-connect is already locked, and returns the message to the network management terminal as a response via the various function part 56 and the response transmission part 52. When not locked, step S35 creates a normal end message and returns the message to the network management terminal as a response. The normal end message indicates that the process corresponding to the received command is correctly performed. At the same time, step S35 locks the cross-connect that is specified by the command and registers lock information in the database 60.

FIG. 9 is a flow chart for explaining another embodiment of the process performed by the network element when receiving an unlock command. The process will be explained for the network element shown in FIG. 4, for example. In FIG. 9, when an unlock command is received, the control function part 58 determines whether or not a cross-connect is set at a signal port that is specified by the command in step S41. The determination is made by searching the cross-connect information registered in the database 60. When the cross-connect is not set, step S42 creates a denial message and returns the message to the network management terminal as a response via the various function part 56 and the response transmission part 52.

If the cross-connect is set, step S43 determines whether or not the cross-connect specified by the command is locked. The determination is made by searching the lock information registered in the database 60. When not locked, step S44 creates a message indicating that the cross-connect is not locked and returns the message to the network management terminal as a response via the various function part 56 and the response transmission part 52. When locked, step S45 creates a normal end message and returns the message to the network management terminal as a response. At the same time, step S45 unlocks the cross-connect that is specified by the command and registers the information in the database 60.

As described above, by providing a lock function that locks/unlocks a cross-connect that is set to the network management terminal, in a case where tests such as an operation check and a communication error check of the network element are conducted in parallel with an actual operation, it is possible to avoid erroneous cutting off of a signal used in the actual operation, by setting/canceling the cross-connect of the testing network element for the test after locking a cross-connect that is set in the actual operation.

Figures 10, 11:
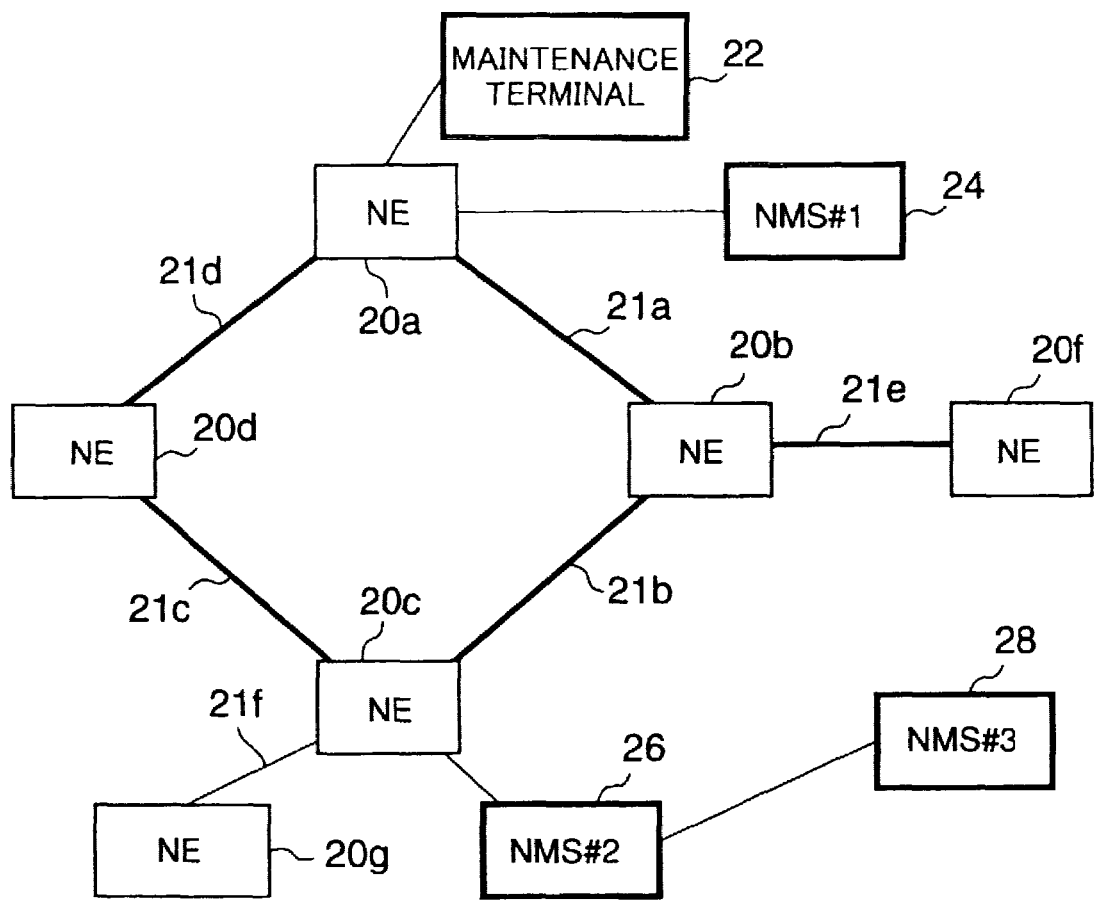
FIG. 10 is a system block diagram of a first embodiment of a network including the NMS.
FIG. 11 is a diagram showing a display for inputting a network management terminal user ID.

FIG. 10 is a system block diagram showing a first embodiment of a network including the NMS. In FIG. 10, network elements 20a through 20d that are high-speed optical network elements having a transmission rate of 2.5 Gbps, for example, are connected by optical fiber transmission channels 21a through 21d in a ring. In addition, a medium-speed optical network element 20f having a transmission rate of 600 Mbps is connected to the network element 20b by an optical fiber transmission channel 21e. Further, a low-speed optical network element 29g having a transmission rate of 150 Mbps is connected to the network element 20c by an optical fiber transmission channel 21f. For example, the network element 20a is provided in Osaka, and the network element 20c is provided in Tokyo. A maintenance terminal 22 and a network management terminal (NMS#1) 24 are connected to the network element 20a in Osaka. A network management terminal (NMS#2) 26 is connected to the network element 20c in Tokyo. Further, a network management terminal (NMS#3) 28 is connected to the network management terminal 26.

The network management terminal 28 is provided with the lock function, and makes the display shown in FIG. 5. However, the other network management terminals 24 and 26 and the maintenance terminal 22 are not provided with the lock function, and make the display shown in FIG. 5 in a state without the lock button 82 and the unlock button 83.

As described above, by providing the lock function only to the network management terminal 28, it is possible to distinguish the network management terminal 28 from the other network management terminals 24 and 26 and the maintenance terminal 22. Thus, in a case where tests such as an operation check and a communication error check of a network element are conducted in parallel with an actual operation, it is possible to avoid erroneous cutting off of a signal used in the actual operation, by setting/canceling the cross-connect of the testing network element for the test after locking a cross-connect that is set in the actual operation by the network management terminal 28, and returning the cross-connect of the testing network element to the original state after the test and unlocking the cross-connect.

Additionally, instead of providing the lock function only in the network management terminal 28, the lock function may be provided only with respect to a specific network management terminal user ID. In this case, when making a log-in to one of the network management terminals 24, 26 and 28, the GUI function part 42 displays a display for inputting a network management terminal user ID as shown in FIG. 11, and the lock function is provided only when the network management terminal user ID input in a frame 90 matches the specific network management terminal user ID.

Figure 12:
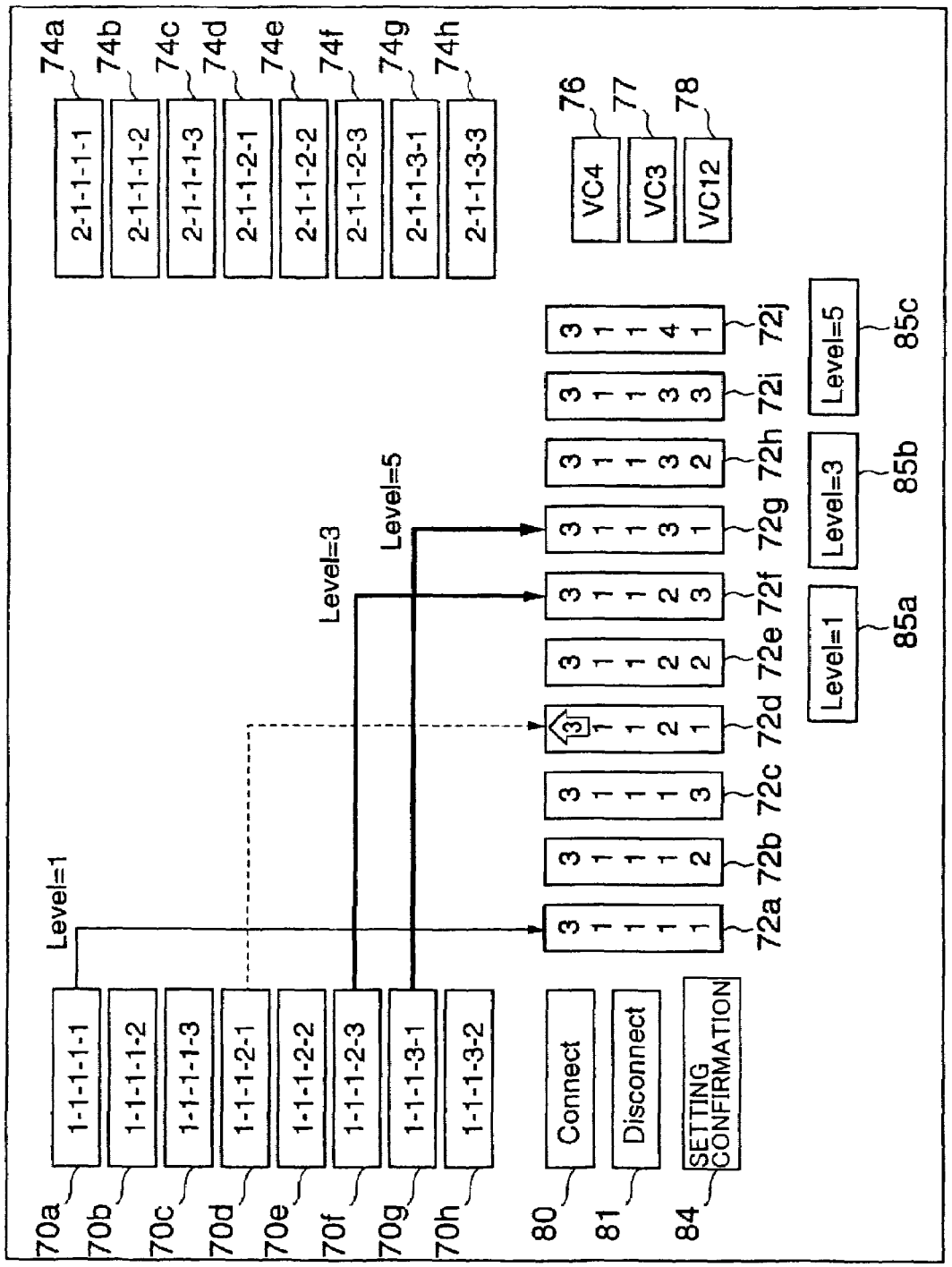
FIG. 12 is a diagram showing a second embodiment of a display made by the GUI function part 42 of the network management terminal.

FIG. 12 is a diagram showing a second embodiment of the display made by the GUI function part 42 of the network management terminal. In FIG. 12, those parts that are the same as those corresponding parts in FIG. 5 are specified by the same reference numerals, and a description thereof will be omitted. The lock button 82 and the unlock button 83 are not displayed in FIG. 12. In FIG. 12, buttons 85a, 85b and 85c for selecting the priority level of the cross-connect are displayed.

When boxes 70d and 72d are clicked, a cross-connect between a VC12 signal port (1-1-1-2-1) of the box 70d of the optical fiber transmission channel 21a and a VC12 signal port (3-1-1-2-1) of the box 72d of the optical fiber transmission channel 21e is selected and displayed by a broken line.

In this state, when the button 85b is clicked so as to select a priority level 3 and a connect button 80 is clicked, for example, the control function part 38 of the network management terminal transmits a cross-connect command to the network element 20b. The network element 20b sets the cross-connect between the VC12 signal port (1-1-1-2-1) of the box 70d and the VC12 signal port (3-1-1-2-1) of the box 72d at the priority level 3. The higher the priority level is, the bolder the continuous line indicating the set cross-connect is displayed, and the priority level is displayed in a vicinity of the continuous line.

Figure 13:
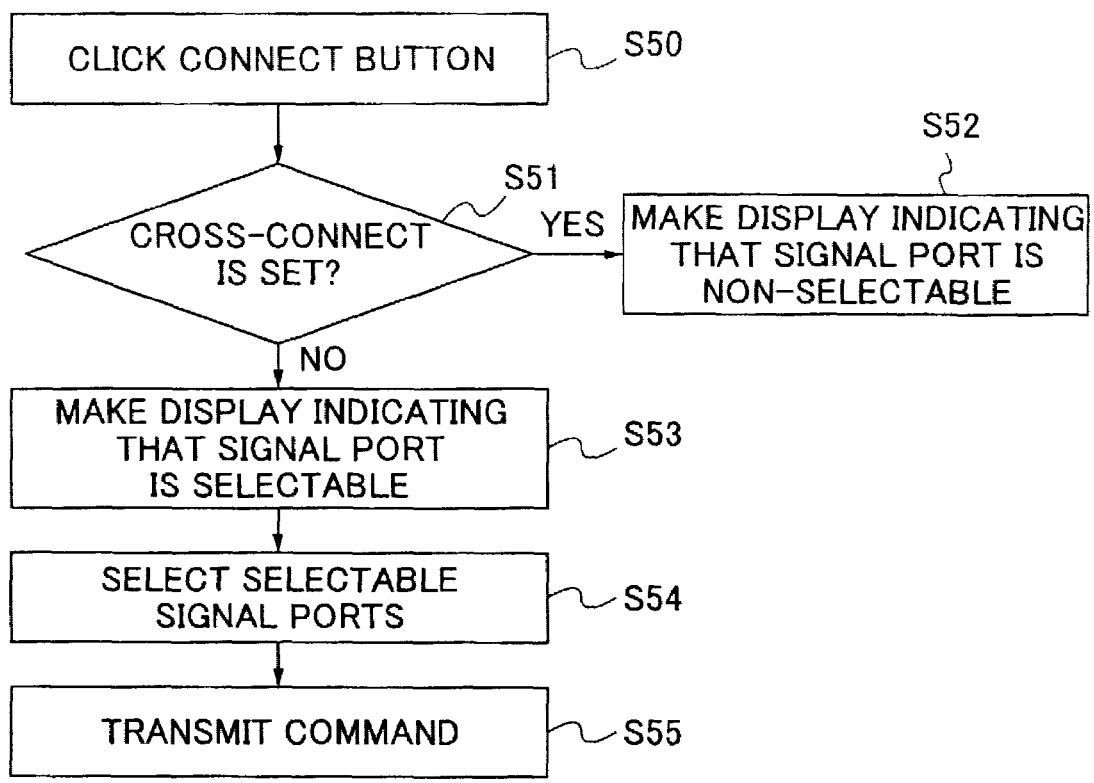
FIG. 13 is a flow chart of an embodiment of the process performed by the network management terminal when a connect button 80 is selected on the display shown in FIG. 12.

FIG. 13 is a flow chart for explaining an embodiment of the process performed by the network management terminal when the connect button 80 is selected on the display shown in FIG. 12. The process will be explained by referring to the display shown in FIG. 12, for example. In FIG. 13, when the connect button 80 is clicked in step S50, the control function part 38 determines, in step S51, whether or not a cross-connect is set at the signal port that is specified. The determination is made by searching the cross-connect information registered in the database 40. When the cross-connect is set, step S52 causes the GUI function part 42 to make a display indicating that the signal port cannot be selected (non-selectable).

When the cross-connect is not set, step S53 causes the GUI function part 42 to make a display indicating that the signal port can be selected (selectable) by changing the color, for example. When the selectable signal port is selected in step S54, the control function part 38 transmits a connect command to a network element in step S55. At the same time, the priority level specified by the button 85a, 85b or 85c is registered in the database 40 as priority information together with the cross-connect information of the cross-connect.

Figure 14:
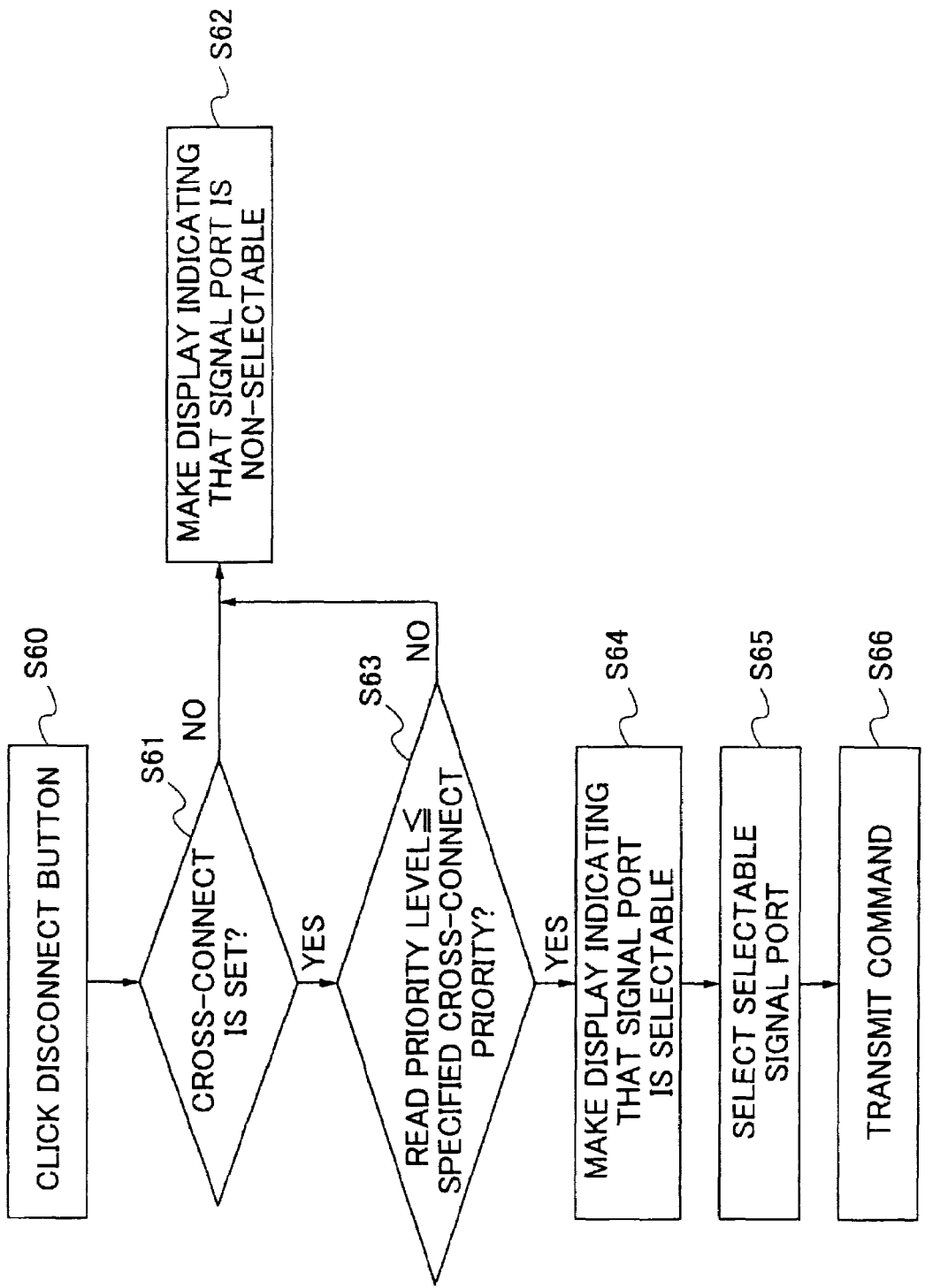
FIG. 14 is a flow chart of an embodiment of the process performed by the network management terminal when a disconnect button 81 is selected on the display shown in FIG. 12.

FIG. 14 is a flow chart for explaining an embodiment of the process performed by the network management terminal when the disconnect button 81 is selected on the display shown in FIG. 12. The process will be explained by referring to the display shown in FIG. 12, for example. In FIG. 14, when a disconnect button 81 is clicked in step S60, the control function part 38 determines, in step S61, whether or not a cross-connect is set at the specified signal port. The determination is made by searching the cross-connect information registered in the database 40. When the cross-connect is not set, the GUI function part 42 displays the signal port as a non-selectable signal port in step S62.

When the cross-connect is set, the priority level of the cross-connect is read from the database 40 in step S63, and the read priority level is compared with the priority level (specified cross-connect priority) specified by the button 85a, 85b or 85c before the disconnect button 81 is clicked. When the specified cross-connect priority is lower than the read priority level, step S62 causes the GUI function part 42 to make a display indicating that the signal port is non-selectable.

When the specified cross-connect priority is higher than the read priority level, step S64 causes the GUI function part 42 to make a display indicating that the port is selectable by changing the color, for example. When the selectable signal port is selected in step S65, the control function part 38 transmits a disconnect command to the network element in step S66.

When a network element user ID is FUJITSU, a command that sets a cross-connect between the signal port (1-1-1-2-1) and the signal port (3-1-1-2-1) at the priority level 3 is, for example, as follows:
  ENT-VC12:FUJITSU:1-1-1-2-1,3-1-1-2-1:CATG::3;.
A command that cancels the setting of the cross-connect is as follows:
  DLT-VC12:FUJITSU:1-1-1-2-1,3-1-1-2-1:CATG::3;.
In addition, a command that confirms the setting and a response thereto is as follows:
  RTRV-CRS-VC12:FUJITSU:,:CATG:::;
  "1-1-1-1-1,3-1-1-1-1::1;"
  "1-1-1-2-3,3-1-1-2-3::3;".

Figure 15:
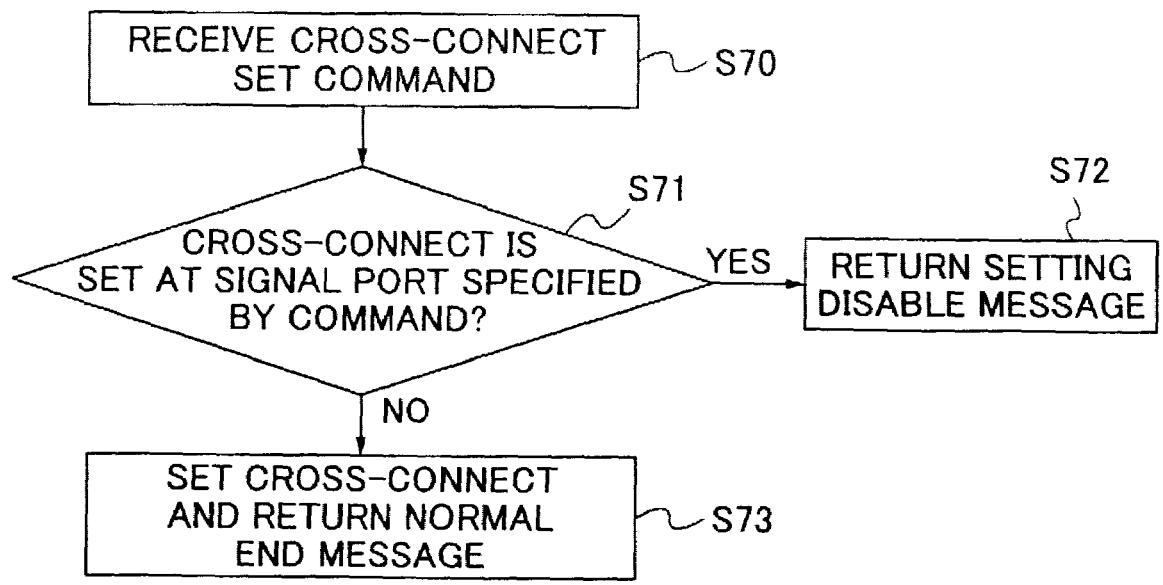
FIG. 15 is a flow chart of an embodiment of the process performed by the network element when receiving a cross-connect set command.

FIG. 15 is a flow chart for explaining an embodiment of the process performed by the network element when receiving a cross-connect set command. The process will be explained for the network element shown in FIG. 4, for example. In FIG. 15, a cross-connect set command is received in step S70. In step S71, the control function part 58 determines whether or not a cross-connect is set at signal ports specified by the command. This determination is made by searching the cross-connect information registered in the database 60. When the cross-connect is set, a setting disable message is created in step S72. The setting disable message is returned as a response to a network management terminal via the various function part 56 and the response transmission part 52.

When a cross-connect is not set, a cross-connect between the signal ports specified by the command is set at the specified priority level in step S73. In addition, information of the cross-connect and the priority level is registered in the database 60. Further, a normal end message is created and returned to the network management terminal as a response. It should be noted that the priority function part 56a performs the management of the priority level such as registering priority level information in the database 60.

Figure 16:
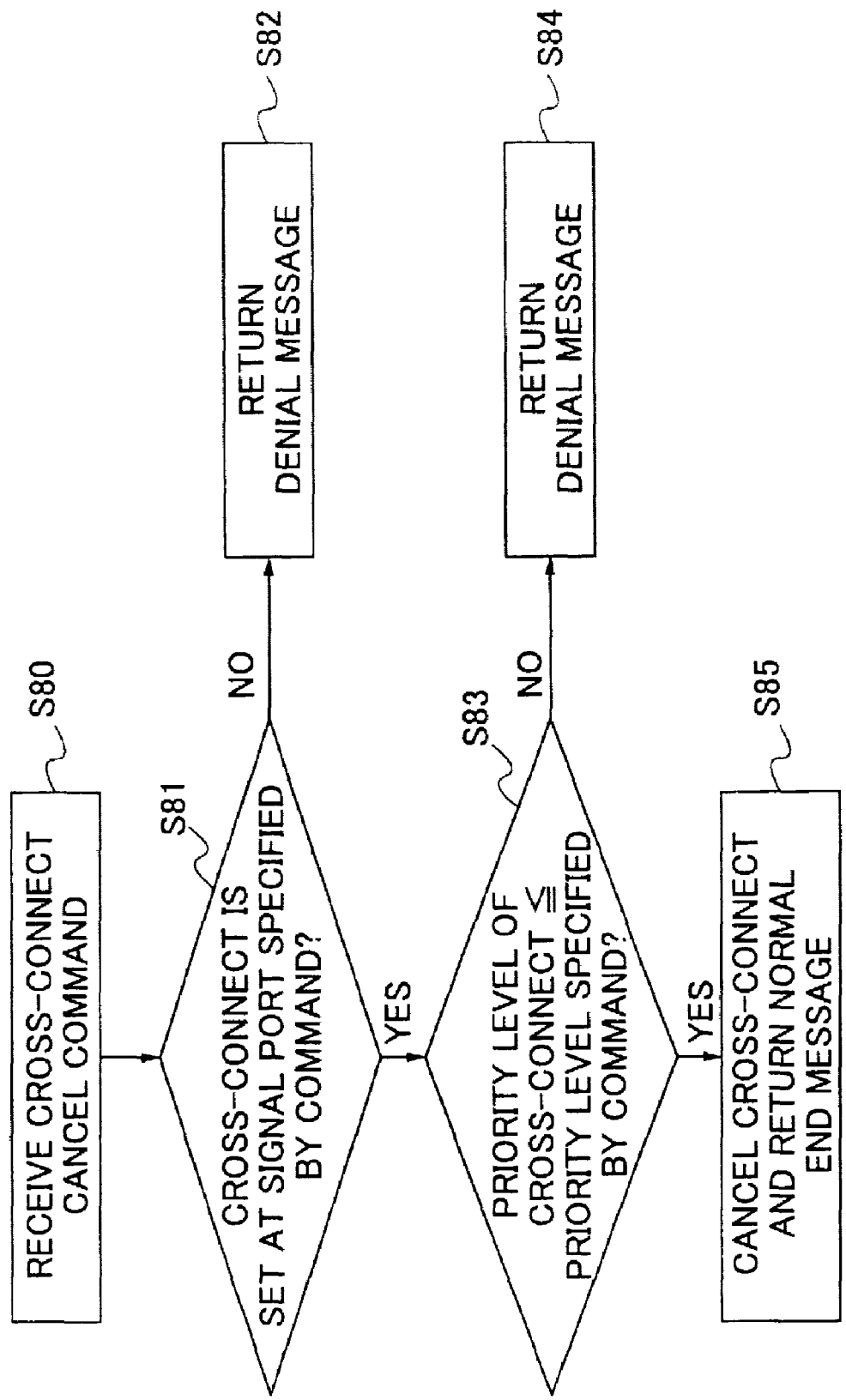
FIG. 16 is a flow chart of an embodiment of the process performed by the network element when receiving a cross-connect cancel command.

FIG. 16 is a flow chart for explaining an embodiment of the process performed by the network element when receiving a cross-connect cancel command. The process will be explained for the network element shown in FIG. 4, for example. In FIG. 16, when the cross-connect cancel command is received in step S80, the control function part 58 determines, in step S81, whether or not a cross-connect is set at signal ports specified by the command. The determination is made by searching the cross-connect information registered in the database 60. When the cross-connect is not set, step S82 creates a denial message and returns the message to a network management terminal as a response via the various function part 56 and the response transmission part 52.

When the cross-connect is set, the priority function part 56a determines whether or not the priority level of the cross-connect is equal to or less than the priority level that is specified by the command.

The priority level of the cross-connect is searched from the priority level information registered in the database 60. When the priority level of the cross-connect is higher than the priority level specified by the command, step S84 creates a denial message and returns the message to a network management terminal as a response via the various function part 56 and the response transmission part 52. When the priority level of the cross-connect is lower than the priority level specified by the command, the priority function part 56a cancels, in step S85, the cross-connect that is specified by the command, registers the information in the database 60, creates a normal end message and returns the message as a response to a network management terminal.

As described above, by adding the priority to a command that sets/cancels a cross-connect, in a case where tests such as an operation check and a communication error check of a network element are conducted in parallel with an actual operation, it is possible to avoid erroneous cutting off of a signal used in the actual operation, by setting the priority of a cross-connect that is set in the actual operation higher, and setting the priority of the setting/cancellation of cross-connect of the testing network elements lower for the tests.

Figure 17:
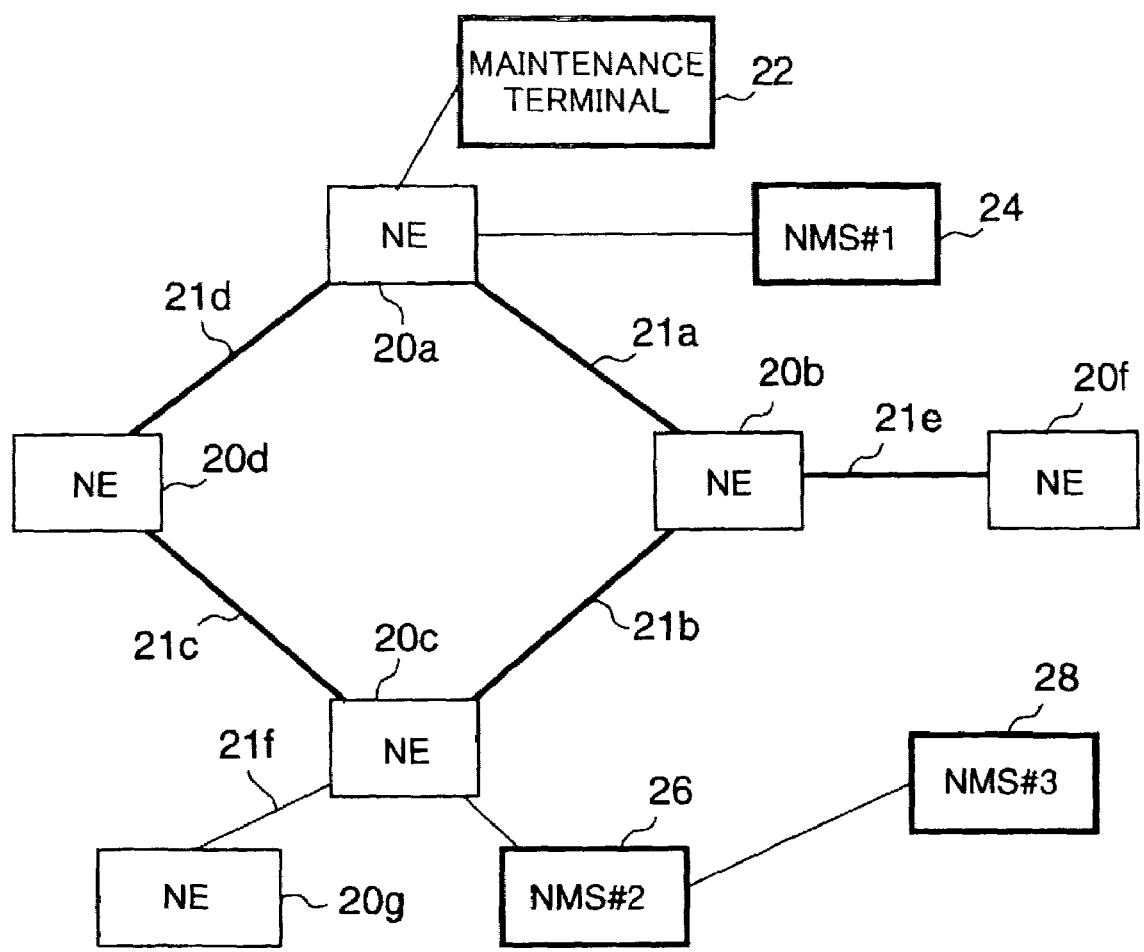
FIG. 17 is a system block diagram showing of a second embodiment of a network including the NMS.

FIG. 17 is a system block diagram showing a second embodiment of a network including the NMS. In FIG. 17, those parts that are the same as those corresponding parts in FIG. 10 are specified by the same reference numerals, and a description thereof will be omitted. A maintenance terminal 22 and network management terminals 24, 26 and 28 are added with respective priorities beforehand. In this case, the maintenance terminal 22 has priority=1, the network management terminal 24 has priority=3, the network management terminal 26 has priority=4, and the network management terminal 28 has priority=5. Then, priority of each of the network management terminals is added to a command transmitted from each of the network management terminals to a network element. The network management terminals handle the priorities similarly to that shown in FIGS. 15 and 16.

As described above, by adding respective priority levels to the maintenance terminal 22 and the network management terminals 24, 26 and 28 beforehand, it is possible to distinguish each of the terminals. Thus, in a case where tests such as an operation check and a communication error check of a network element are conducted in parallel with an actual operation, a terminal that has a lower priority level cannot change the setting/cancellation of a cross-connect that is set by the network management terminal of a higher priority level. The network management terminal of the highest priority level can change the setting/cancellation of all cross-connects. Accordingly, it is possible to prevent a signal used in the actual operation from being erroneously cut off.

In addition, instead of adding respective priority levels to the network management terminals 24, 26 and 28 beforehand, each network management terminal user ID may have own priority level. In this case, when making a log-in to one of the network management terminals 24, 26 and 28, the GUI function part 42 displays the display as shown in FIG. 11 for inputting a network management terminal user ID, and adds the priority level corresponding to the network management terminal user ID that is input in a frame 90.

Figure 18:
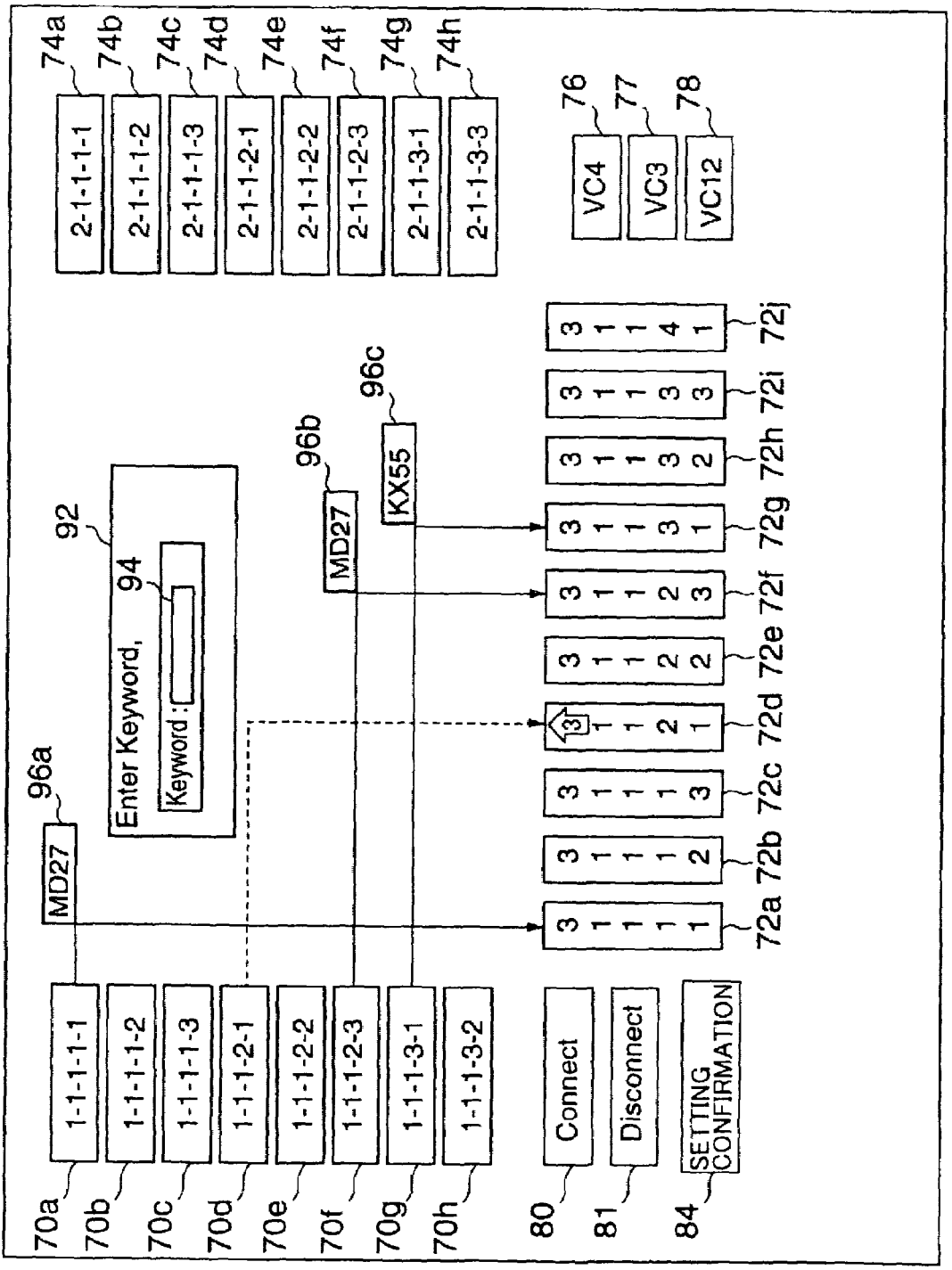
FIG. 18 is a diagram showing a third embodiment of a display made by the GUI function part 42 of the network management terminal.

FIG. 18 shows a third embodiment of the display made by the GUI function part 42 of the network management terminal. In FIG. 18, those parts that are the same as those corresponding parts in FIG. 12 are specified by the same reference numerals, and a description thereof will be omitted. In FIG. 18, a window 92 for inputting a keyword is made and a keyword input frame 94 is provided therein.

At first, the window 92 is not displayed. However, when boxes 70d and 72d are clicked, a cross-connect between a VC12 signal port (1-1-1-2-1) of a box 70d of the optical fiber transmission channel 21a and a VC12 signal port (3-1-1-2-1) of a box 72d of the optical fiber transmission channel 21e is selected. The cross-connect is displayed by a broken line, and at the same time, the window 92 is displayed.

In this state, when a keyword is input in the keyword input frame 94 and a connect button 80 is clicked, the control function part 38 of the network management terminal transmits a cross-connect command to a network element 20b. The network element 20b sets the cross-connect between the VC12 signal port (1-1-1-2-1) of the box 70d and the VC12 signal port (3-1-1-2-1) of the box 72d. Continuous lines indicating set cross-connects are displayed with respective keyword display boxes 96a, 96b and 96c that are used when setting the respective cross-connects.

Figure 19:
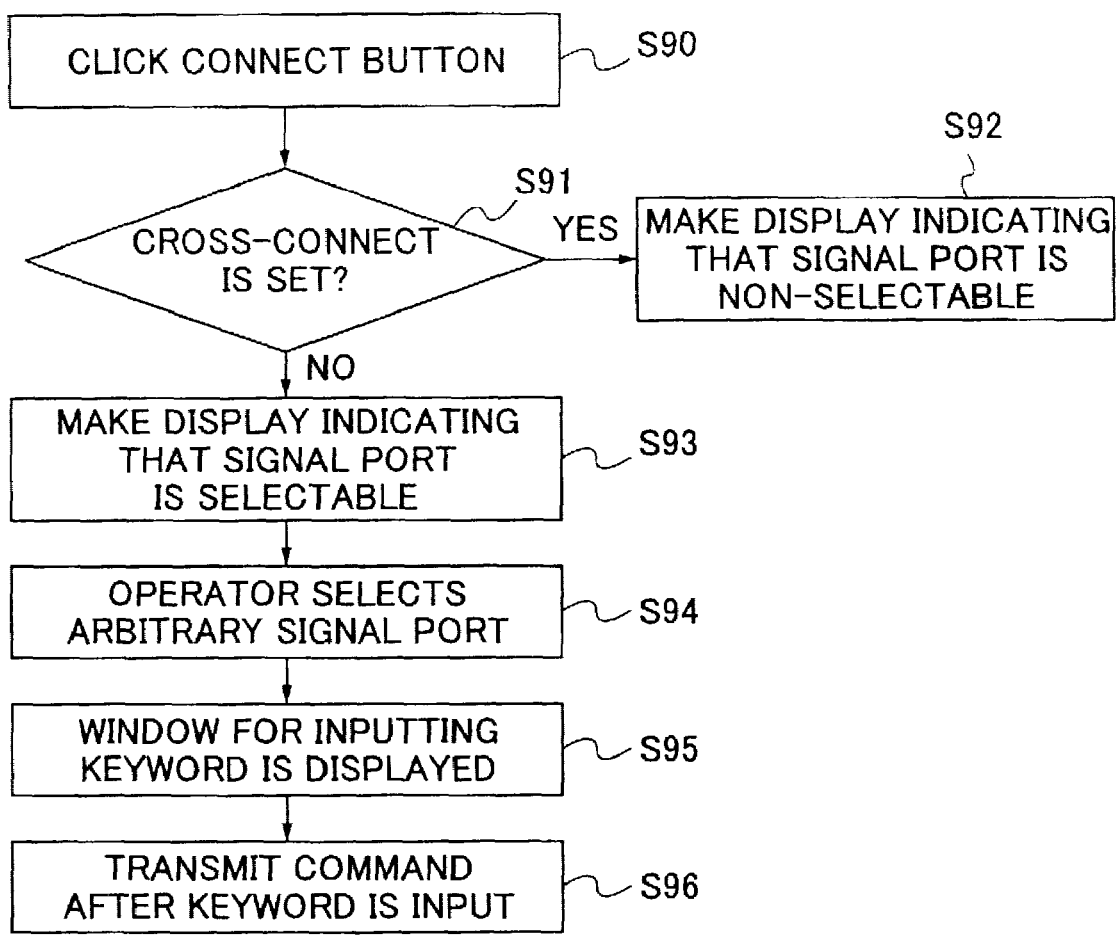
FIG. 19 is a flow chart of an embodiment of the process performed by the network management terminal when a connect button 80 is selected on the display shown in FIG. 18.

FIG. 19 is a flow chart for explaining an embodiment of the process performed by the network management terminal when a connect button 80 is selected on the display shown in FIG. 18. The process will be explained by referring to the display shown in FIG. 18, for example. In FIG. 19, when the connect button 80 is clicked in step S90, the control function part 38 determines, in step S91, whether or not a cross-connect is set at specified signal port. The determination is made by searching the cross-connect information registered in the database 40. When the cross-connect is set, the GUI function part 42 displays the signal port as a non-selectable signal port in step S92.

If the cross-connect is not set, step S93 causes the GUI function part 42 to make a display indicating that the port is selectable by changing the color, for example. When the selectable port is selected in step S94, the keyword function part 36b displays the window 92 in step S95. After a keyword is input in the keyword input frame 94 in step S96, the control function part 38 transmits a connect command to the network element. At this moment, the above-mentioned keyword is registered in the database 40 with cross-connect information of the cross-connect.

Figure 20:
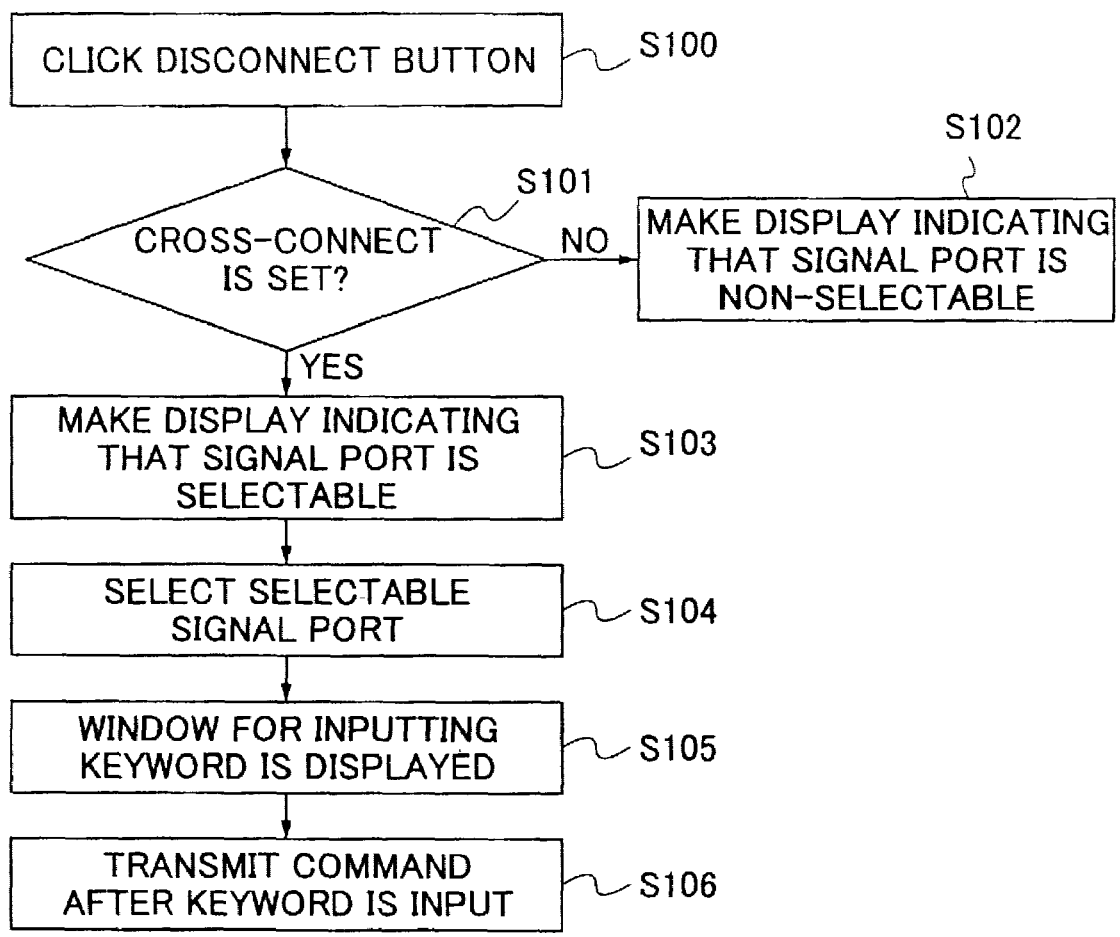
FIG. 20 is a flow chart of an embodiment of the process performed by the network management terminal when a disconnect button 81 is selected on the display shown in FIG. 18.

FIG. 20 is a flow chart for explaining an embodiment of the process performed by the network management terminal when a disconnect button 81 in the display shown in FIG. 18 is selected. The process will be explained by referring to the display shown in FIG. 18, for example. In FIG. 20, when the disconnect button 81 is clicked in step S100, the control function part 28 determines, in step S101, whether or not a cross-connect is set at the specified signal port. The determination is made by searching the cross-connect information registered in the database 40. When the cross-connect is not set, the GUI function part 42 displays the signal port as a non-selectable signal port in step S102.

If the cross-connect is set, step S103 displays the signal port as a selectable signal port by changing the color, for example. When the selectable signal port is selected in step S104, the keyword function part 36b displays the window 92 in step S105. In step S106, after a keyword is input in the keyword input frame 94, the control function part 38 transmits a disconnect command to the network element. At this moment, the database 40 is also updated.

When a network element user ID is FUJITSU, a command that sets a cross-connect between the signal port (1-1-1-2-1) and the signal port (3-1-1-2-1) with a keyword=MD27 is, for example, as follows:

ENT-VC12:FUJITSU:1-1-1-2-1,3-1-1-2-1:CATG:: MD27;.

A command that cancels the setting of the cross-connect is as follows:

DLT-VC12:FUJITSU:1-1-1-2-1,3-1-1-2-1:CATG:: MD27;.

In addition, a command that confirms the setting and a response thereto is, for example, as follows. A keyword is not required for the command that confirms the setting.

RTRV-CRS-VC12:FUJITSU:;:CATG:::;
"1-1-1-1-1,3-1-1-1-1::KEYWORD=MD27;"
"1-1-1-3-1,3-1-1-3-1::KEYWORD=KX55;"

Figure 21:
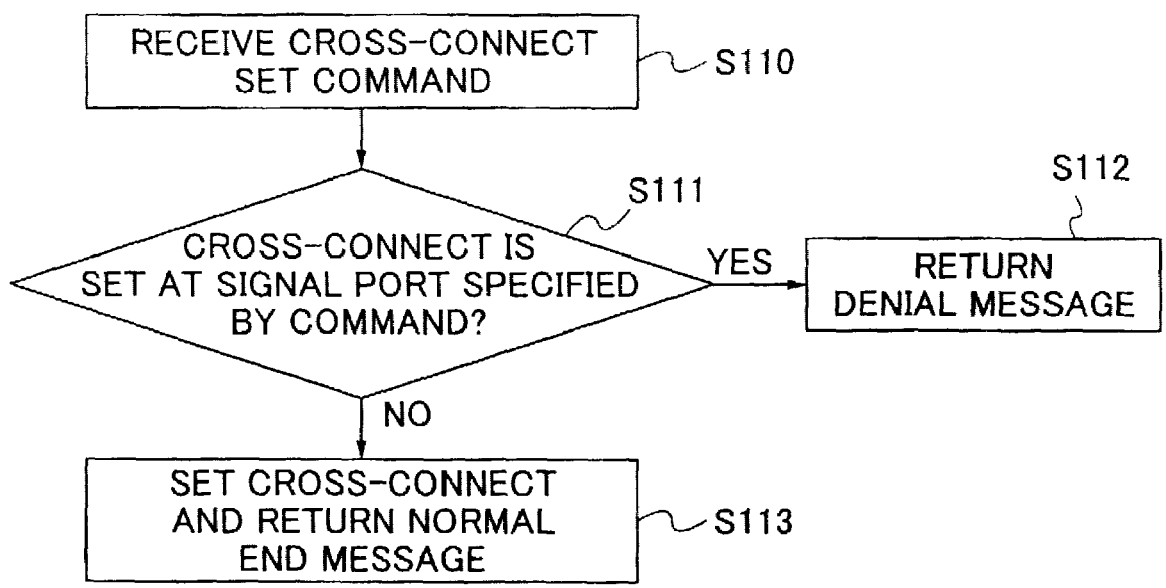
FIG. 21 is a flow chart of an embodiment of the process performed by the network element when receiving a cross-connect set command added with a keyword.

FIG. 21 is a flow chart for explaining an embodiment of the process performed by the network element when receiving a cross-connect set command to which a keyword is added. The process will be explained for the network element shown in FIG. 4, for example. In FIG. 21, when a cross-connect set command is received in step S110, the control function part 58 determines, in step S111, whether or not a cross-connect is set at specified signal ports. The determination is made by searching the cross-connect information registered in the database 60. When the cross-connect is set, a denial message is created in step S112 and returned as a response to the network management terminal via the various function part 56 and the response transmission part 52.

When the cross-connect is not set, the cross-connect between the signal ports that are specified by the command is set with a specified keyword in step S113. In addition, information of the cross-connect and the keyword is registered in the database 60. At the same time, a normal end message is created and returned as a response to a network management terminal. Further, the keyword function part 56b performs the management of keywords such as registering the keyword information in the database 60.

Figure 22:
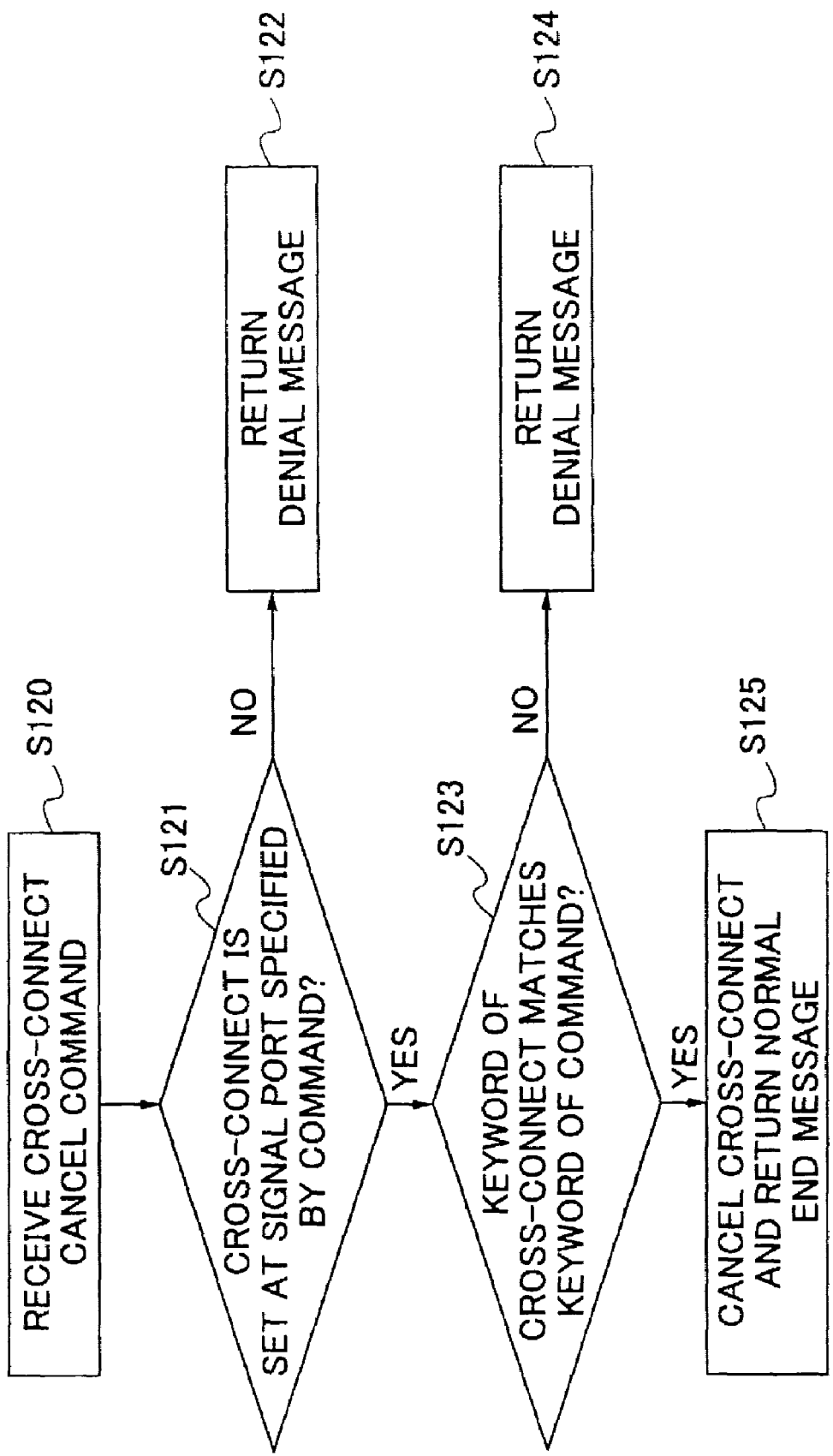
FIG. 22 is a flow chart of an embodiment of the process performed by the network element when receiving a cross-connect cancel command added with a keyword.

FIG. 22 is a flow chart for explaining an embodiment of the process performed by the network element when receiving a cross-connect cancel command added with a keyword. The process will be explained for the network element shown in FIG. 4, for example. In FIG. 22, when the cross-connect cancel command is received in step S120, the control function part 58 determines, in step S121, whether or not a cross-connect is set at specified signal ports. The determination is made by searching the cross-connect information registered in the database 60. When the cross-connect is not set, a denial message is created in step S122 and returned as a response to a network management terminal via the various function part 56 and the response transmission part 52.

When the cross-connect is set, the keyword function part 56b determines, in step S123, whether or not the keyword of the cross-connect matches the keyword that is specified by the command. The keyword of the cross-connect is obtained by searching the keyword information registered in the database 60.

When the above-mentioned keywords do not match, step S124 causes the keyword function part 56b to create a denial message and return the denial message as a response to the network management terminal via the various function part 56 and the response transmission part 52. When the above-mentioned keywords match, step S125 causes the keyword function part 56b to cancel the cross-connect specified by a command, register the information in the database 60, create a normal end message and return the normal end message as a response to the network management terminal.

As described above, by adding a keyword to a command that sets/cancels cross-connect, in a case when test such as an operation check and a communication error check of a network element are conducted in parallel with an actual operation, it is possible to avoid erroneous cutting off of a signal used in the actual operation, by changing a keyword for setting/canceling a cross-connect set in the actual operation and a keyword for setting/canceling a cross-connect of the testing network elements for the tests.

Figure 23:
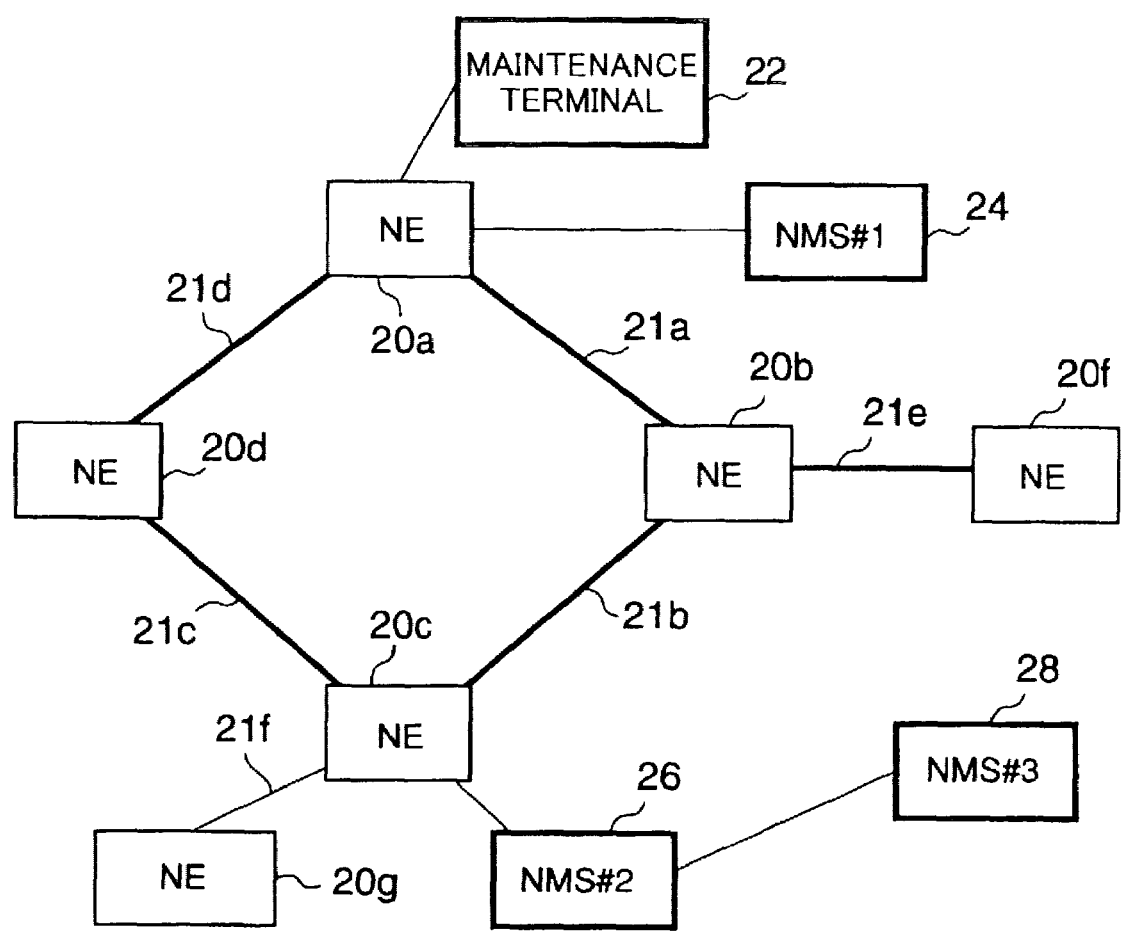
FIG. 23 is a system block diagram of a third embodiment of a network including the NMS.

FIG. 23 is a system block diagram of a third embodiment of a network including the NMS. In FIG. 23, those parts that are the same as those corresponding parts in FIG. 10 are specified by the same reference numerals, and a description thereof will be omitted. Respective keywords are added to a maintenance terminal 22 and network management terminals 24, 26 and 28 beforehand. In this case, the maintenance terminal has a blank keyword, the network management terminal 24 has a keyword=KX55, the network management terminal 26 has a blank keyword, and the network management terminal 28 has a keyword=MD27. Then, the keyword of the network management terminal is added to a command transmitted from each of the network management terminals to a network element. The keywords of the network management terminals are handled similarly to those in FIGS. 19 and 20.

As described above, by adding the keywords to the network management terminals 24 and 28, terminals to which cross-connect is set are specified. In a case where tests such as an operation check and a communication error check of a network element are conducted in parallel with an actual operation, the network management terminal 28 having the keyword D27 cannot set/cancel a cross-connect of a testing network element for the tests. For example, the network management terminal 28 cannot cancel the cross-connect that is set by another network management terminal 24. Thus, it is possible to avoid erroneous cutting off of a signal used in the actual operation.

Figure 24:
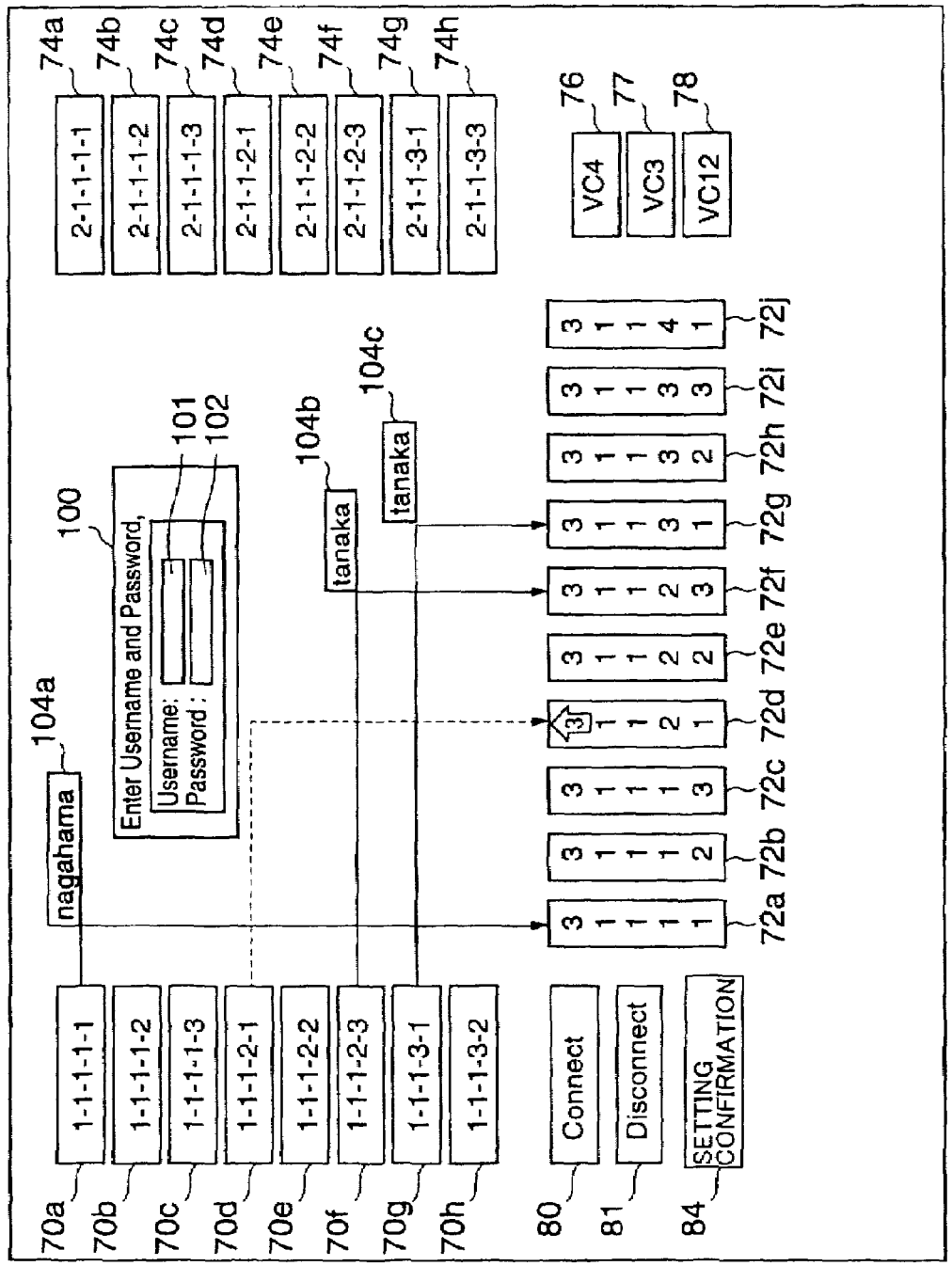
FIG. 24 is a diagram showing a fourth embodiment of a display made by the GUI function part 42 of the network management terminal.

FIG. 24 shows a fourth embodiment of the display made by the GUI function part 42 of the network management terminal. In FIG. 24, those parts that are the same as those corresponding parts in FIG. 12 are specified by the same reference numerals, and a description thereof will be omitted. In FIG. 24, a window 100 for inputting a user name and a password is displayed. The window 100 includes a user name input frame 101 and a password input frame 102.

At first, the window 100 is not displayed. However, when boxes 70d and 72d are clicked, a cross-connect between a VC12 signal port (1-1-1-2-1) of the box 70d of the optical fiber transmission channel 21a and a VC12 signal port (3-1-1-2-1) of the box 72d of the optical fiber transmission channel 21e is selected and displayed by a broken line. At the same time, the window 100 is displayed.

In this state, when a user name is input to the user name input frame 101, a password is input to the password input frame 102 and a connect button 80 is clicked, the control function part 38 of the network management terminal transmits a cross-connect command to the network element 20b. The network element 20b sets the cross-connect between the VC12 signal port (1-1-1-2-1) of the box 70d and the VC12 signal port (3-1-1-2-1) of the box 72d. Continuous lines indicating set cross-connects are displayed with respective user name display boxes 104a, 104b and 104c that display user names of users who sets the cross-connects.

Figure 25:
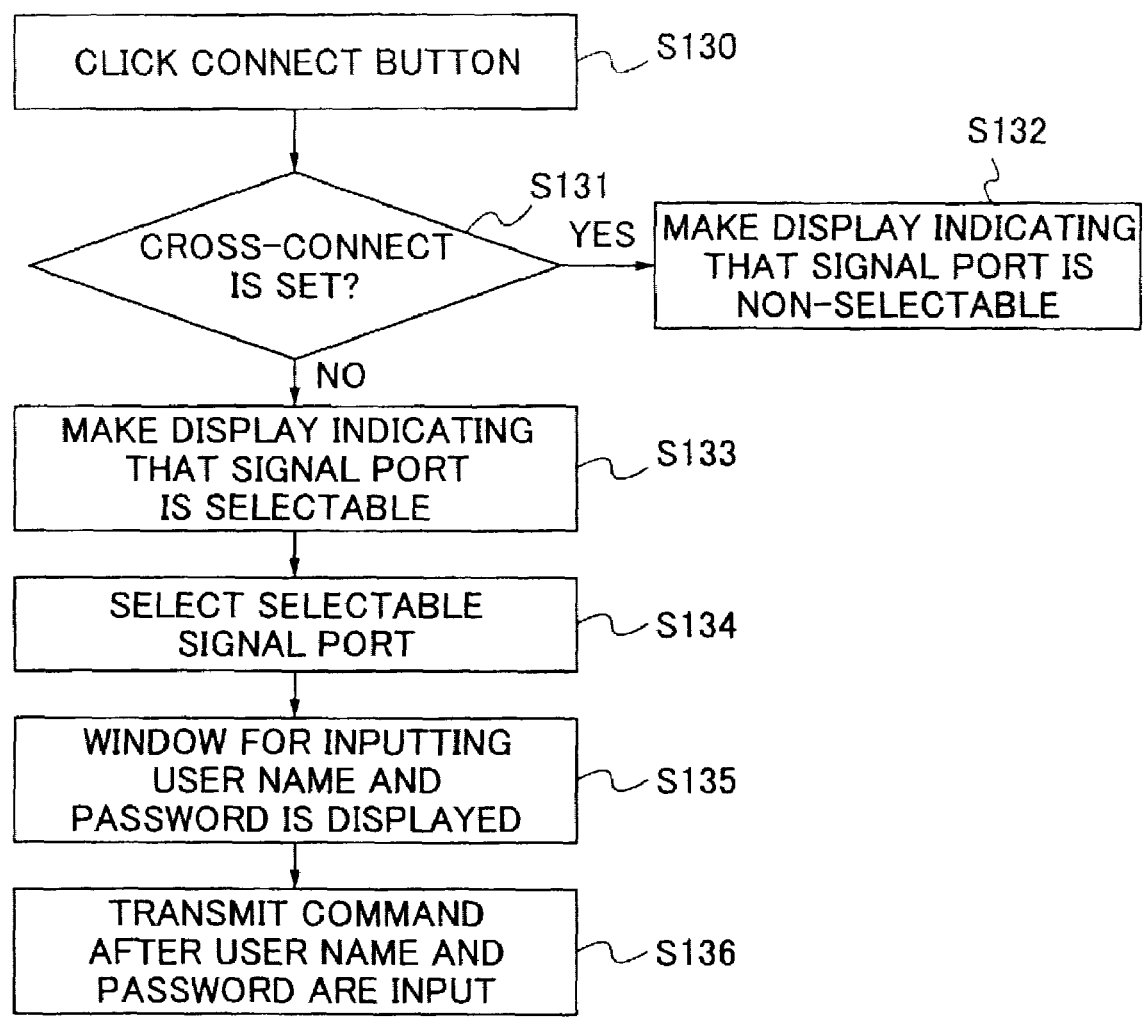
FIG. 25 is a flow chart of an embodiment of the process performed by the network management terminal when a connect button 80 is selected on the display shown in FIG. 24.

FIG. 25 is a flow chart for explaining an embodiment of the process performed by the network management terminal when a connect button 80 is selected on the display shown in FIG. 24. The process will be explained by also referring to FIG. 24. In FIG. 25, when the connect button 80 is clicked in step S130, the control function part 38 determines whether or not a cross-connect is set at specified signal ports in step S131. The determination is made by searching the cross-connect information registered in the database 40. When the cross-connect is set, the GUI function part 42 displays in the display that the ports cannot be selected in step S132.

When the cross-connect is not set, the GUI function part 42 displays in the display that the signal ports can be selected by changing the color, for example, in step S133. When the signal ports that can be selected are selected in step S134, the password function part 36c displays the window 100 in step S135. In step S136, after a user name is input to the user name input frame 101 and a password is input to the password input frame 102, the control function part 38 transmits a connect command to the network element. At this moment, the above-mentioned user name and password are registered in the database 40 with the cross-connect information of the cross-connect.

Figure 26:
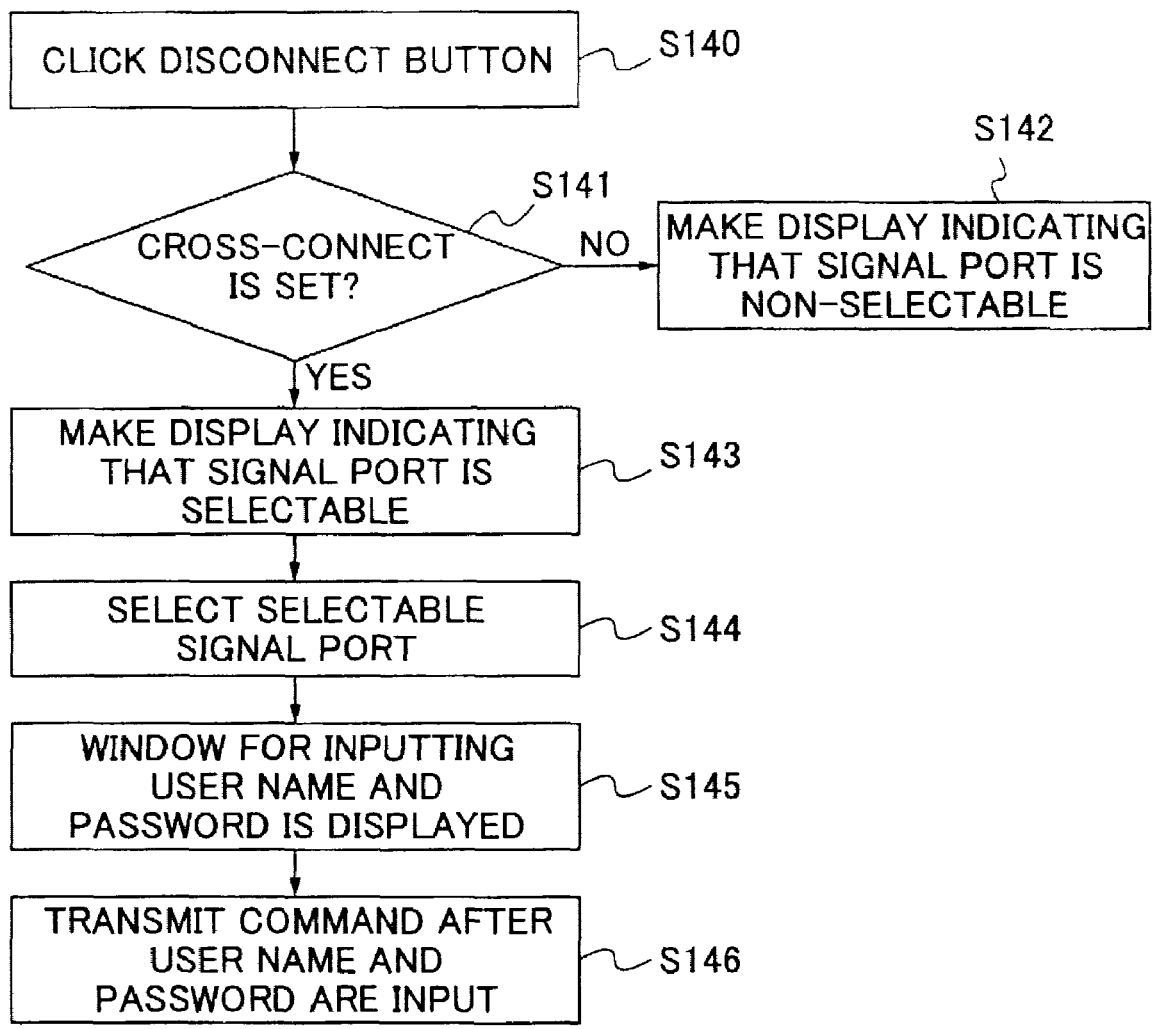
FIG. 26 is a flow chart of an embodiment of the process performed by the network management terminal when a disconnect button 81 is selected on the display shown in FIG. 24.

FIG. 26 is a flow chart for explaining an embodiment of the process performed by the network management terminal when a disconnect button 81 is selected on the display shown in FIG. 24. The process will be explained by also referring to FIG. 24. In FIG. 26, when the disconnect button 81 is clicked in step S140, the control function part 38 determines, in step S140, whether or not a cross-connect is set at the specified signal ports. The determination is made by searching the cross-connect information registered in the database 40. When the cross-connect is not set, the GUI function part 42 displays the signal port as a non-selectable signal port in step S142.

If the cross-connect is set, step S143 makes a display indicating that the port is selectable by changing the color, for example. When the selectable signal port is selected in step S144, the password function part 36b displays the window 100 in step S145. In step S146, after a user name is input to the user name input frame 101 and a password is input to the password input frame 102, the control function part 38 transmits a disconnect command to a network element. At this moment, the database 40 is also updated.

When a network element user ID is FUJITSU, a command that sets cross-connect between a signal port (1-1-1-2-1) and a signal port (3-1-1-2-1) with a user name=nagahama and a password=XXXXXX is, for example, as follows:
 ENT-VC12:FUJITSU:1-1-1-2-1,3-1-1-2-1:CATG::naga-hama,XXXXXX;.

A command that cancels this cross-connect is as follows:
 DLT-VC12:FUJITSU:1-1-1-2-1,3-1-1-2-1:CATG::naga-hama,XXXXXX;.

In addition, a setting confirmation command and a response thereto are, for example, as follows. The setting confirmation command does not require a user name and a password.
 RTRV-CRS-VC12:FUJITSU:;:CATG:::;
 "1-1-1-1-1,3-1-1-1-1::USERNAME=nagahama;"
 "1-1-1-2-3,3-1-1-2-3::USERNAME=tanaka;"
 "1-1-1-3-1,3-1-1-3-1::USERNAME=tanaka;"

Figure 27:
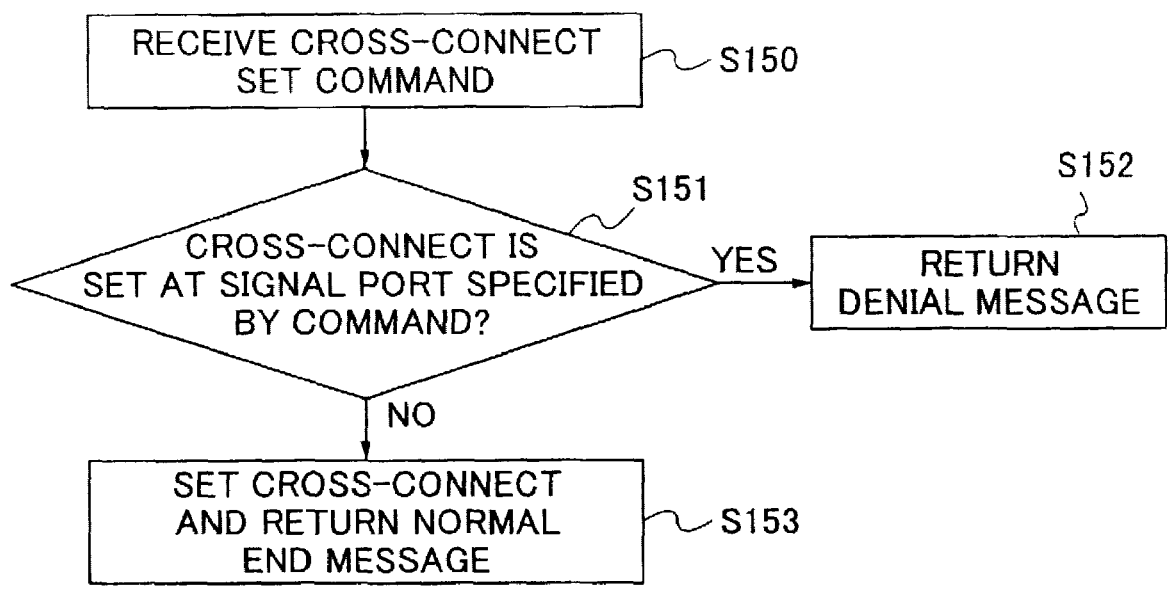
FIG. 27 is a flow chart of an embodiment of the process performed by the network element when receiving a cross-connect set command added with a password.

FIG. 27 is a flow chart for explaining an embodiment of the process performed by the network element when receiving a cross-connect set command added with a password. The process will be explained for the network element shown in FIG. 4, for example. In FIG. 27, when a cross-connect set command is received in step S150, the control function part 58 determines, in step S151, whether or not a cross-connect is set at signal ports specified by a command. The determination is made by searching the cross-connect information registered in the database 60. When the cross-connect is set, a denial message is created in step S152 and returned as a response to the network management terminal via the various function part 56 and the response transmission part 52.

If the cross-connect is not set, step S153 sets the cross-connect between the signal ports specified by the command with a specified password. In addition, information of the cross-connect and the password is registered in the database 60. At the same time, a normal end message is created and returned as a response to the network management terminal. Further, it should be noted that the password function part 56c performs management of password such as registering password information in the database 60 and the like.

Figure 28:
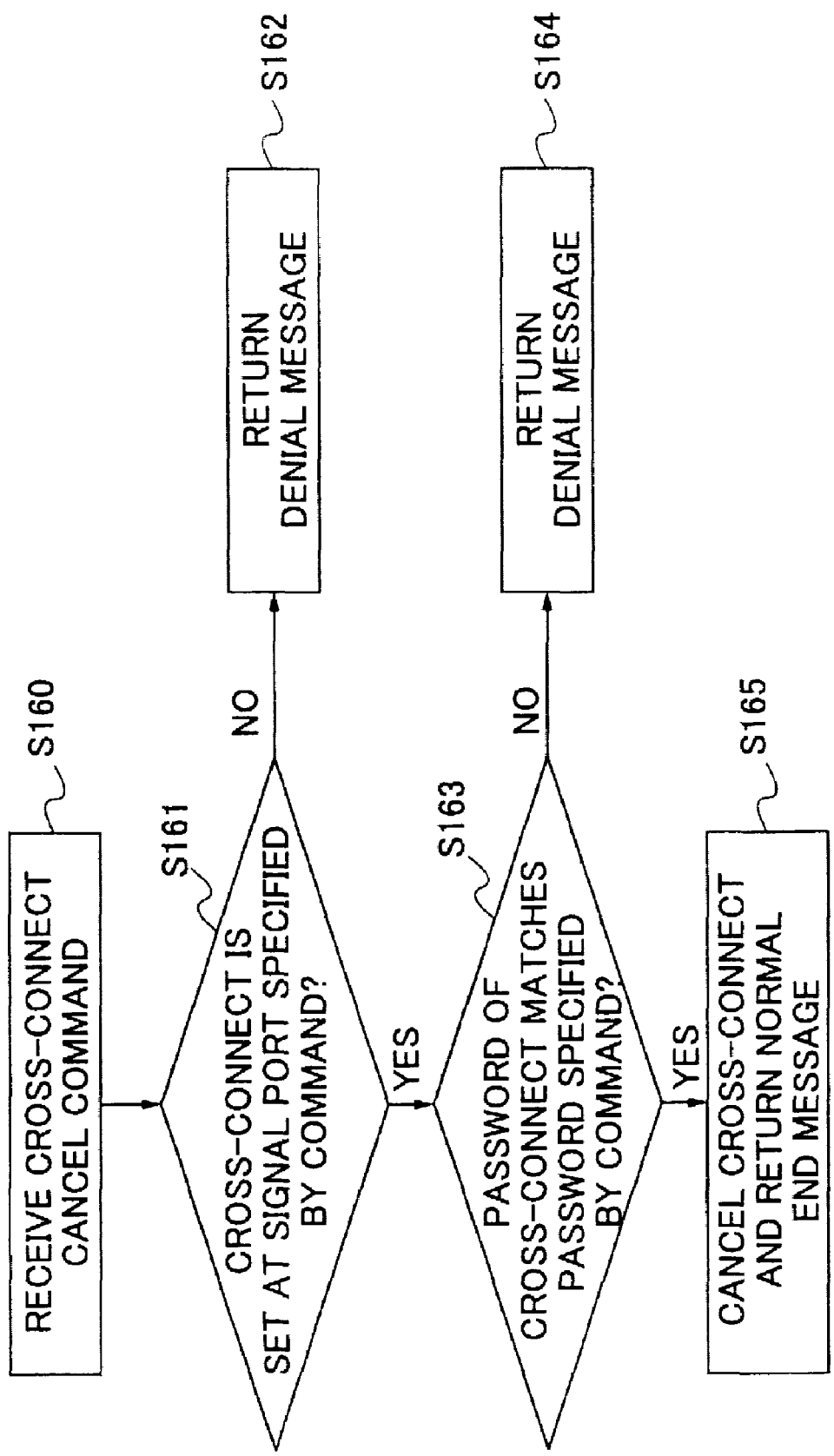
FIG. 28 is a flow chart of an embodiment of the process performed by the network element when receiving a cross-connect cancel command added with a password.

FIG. 28 is a flow chart for explaining an embodiment of the process performed by the network element when receiving a cross-connect cancel command added with a password. The process will be explained for the network element shown in FIG. 4, for example. In FIG. 28, when the cross-connect cancel command is received in step S160, the control function part 58 determines, in step S161, whether or not a cross-connect is set to signal ports specified by the command. The determination is made by searching the cross-connect information registered in the database 60. When the cross-connect is not set, a denial message is created in step S162 and returned as a response to the network management terminal via the various function part 56 and the response transmission part 52.

When the cross-connect is set, the password function part 56c determines, in step S163, whether or not a password of the cross-connect matches a password specified by the command. The password of the cross-connect is obtained by searching the password information registered in the database 60.

When the above-mentioned passwords do not match, the password function part 56c creates a denial message in step S164 and returns the message as a response to the network management terminal via the various function part 56 and the response transmission part 52. When the passwords match, the password function part 56c cancels, in step S165, the cross-connect specified by the command and registers the information in the database 60. At the same time, the password function part 56c creates a normal end message and returns the normal end message as a response to the network management terminal.

As described above, by adding a user name and a password to a command for setting/canceling cross-connect, in a case where tests such as an operation check and a communication error check of a network element in parallel with an actual operation, it is possible to avoid erroneous cutting off of a signal used in the actual operation, by changing a password for setting/canceling a cross-connect set in the actual operation from a password for setting/canceling a cross-connect of the testing network elements for the tests. Further, the keyword is displayed with the cross-connect as shown in FIG. 18. However, the password is not displayed with the cross-connect as shown in FIG. 24. Accordingly, unauthorized use can be prevented.

Figure 29:
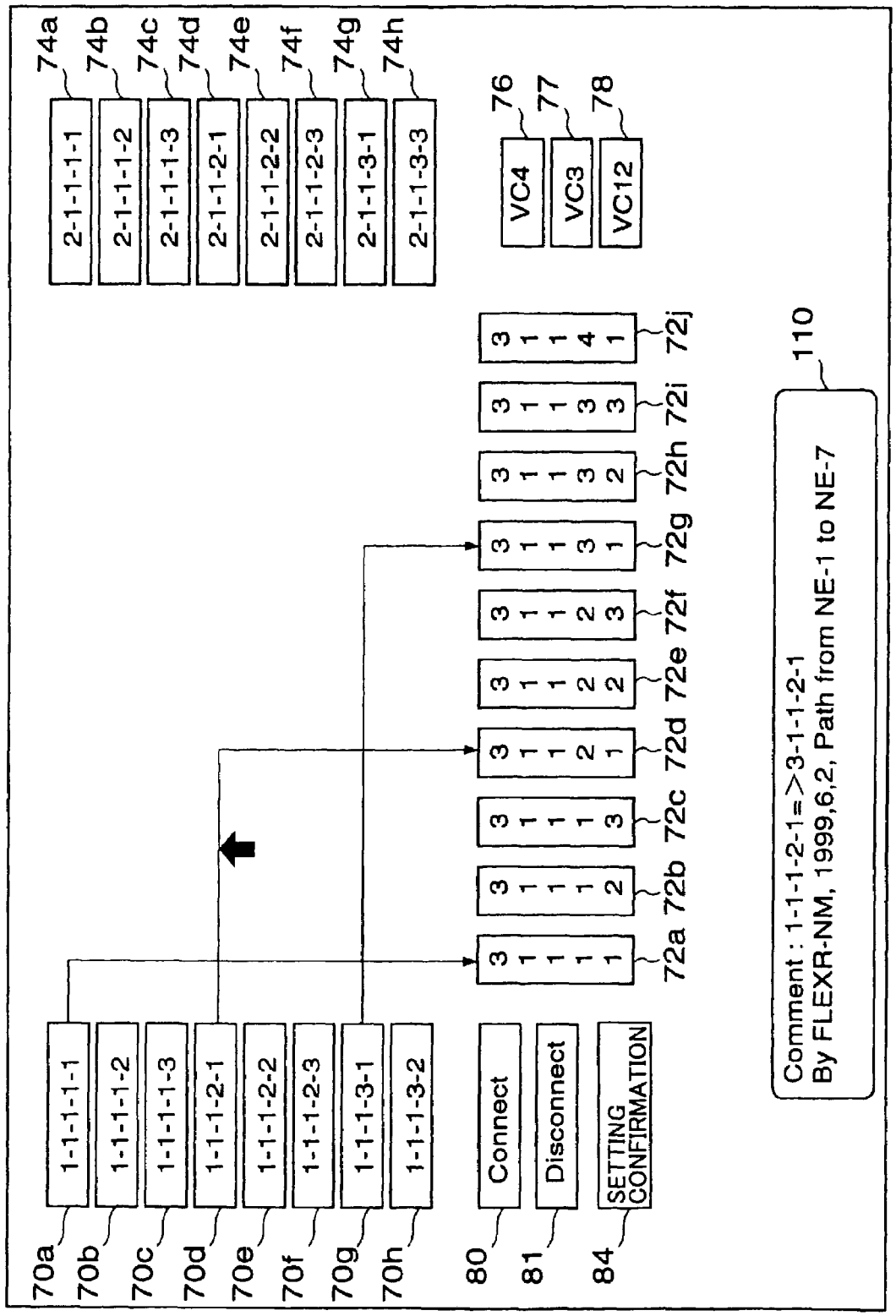
FIG. 29 is a diagram showing a fifth embodiment of a display made by the GUI function part 42 of the network management terminal.
Figure 30:
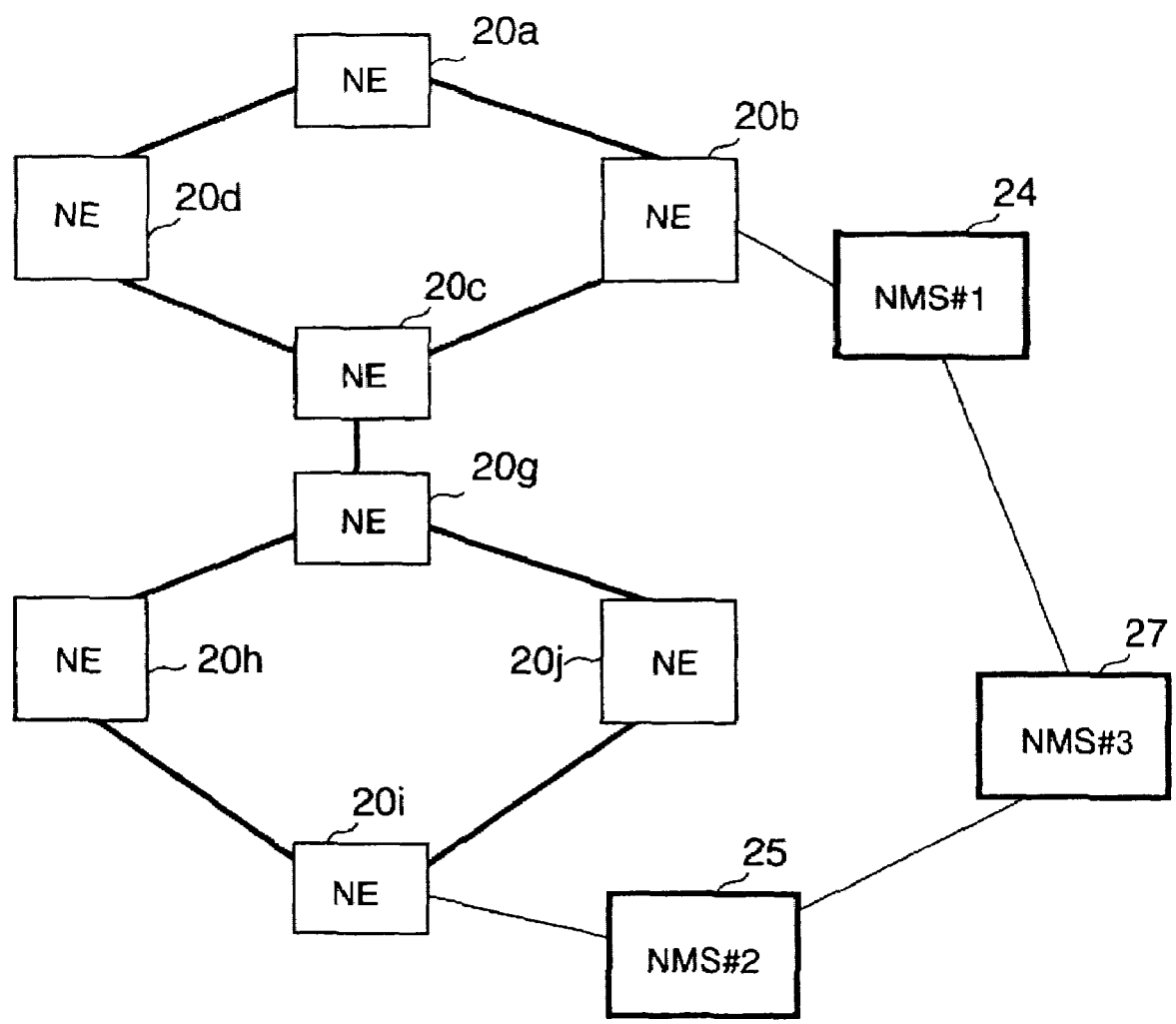
FIG. 30 is a system block diagram of another example of a network including the NMS.

FIG. 29 shows a fifth embodiment of a display made by the GUI function part 42 of the network management terminal. In FIG. 29, those parts that are the same as those corresponding parts in FIG. 12 are specified by the same reference numerals, and a description thereof will be omitted. In FIG. 29, a display 110 for inputting a comment is displayed.

The display 110 is displayed when a continuous line indicating a set cross-connect (boxes 70d and 72d) is clicked. A comment added to the cross-connect is displayed in the display 110.

Additionally, when setting a cross-connect, when boxes 70e and 72e are clicked, for example, the cross-connect between the boxes is selected and displayed by a broken line. At the same time, the display 110 is displayed.

In this sate, when a comment is input to the display 110 and a connect button 80 is clicked, the comment function part 36d of the network management terminal registers the comment in the database 40. The control function part 38 transmits a cross-connect set command added with the comment to the network element 20b. The network element 20b sets a cross-connect between a VC12 signal port (1-1-1-2-2) of the box 70e and a VC12 signal port (3-1-1-2-2) of the box 72e.

When the network element 20b receives the cross-connect set command added with the comment, the comment function part 56d registers the comment in the command in the database 60. Then, when the network element 20b receives a setting confirmation command, the comment function part 56d reads the comment with the cross-connect information from the database 60, and returns the comment and cross-connect information to the network management terminal that performs the setting confirmation.

The setting confirmation command and a response thereto are, for example, as follows:

RTRV-CRS-VC12:FUJITSU:;:CATG::::;
"1-1-1-1-1,3-1-1-1-1::¥FLEXR PLUS 99-06-02¥;"
"1-1-1-2-1,3-1-1-2-1::¥FLEXR-NM 99-06-02¥;"
"1-1-1-3-1,3-1-1-3-1::¥FLEXR-EM 99-06-08¥;".

As described above, by adding a comment to a command for setting/canceling a cross-connect, in a case where tests such as an operation check and a communication error check are conducted in parallel with an actual operation, it is possible to set/cancel a cross-connect of the testing network elements for the tests in consideration of a comment of the cross-connect set in the actual operation. At the same time, by adding a specific comment to a cross-connect set for the tests, it is possible to avoid erroneous cutting off of a signal used in the actual operation when conducting the tests. Further, after the tests, it is possible to cancel all cross-connects that are set for the tests.

Further, the present invention is not limited to these embodiments, but various variations and modifications may be made without departing from the scope of the present invention.

The invention claimed is:

1. A cross-connect protection method of protecting a cross-connect at each of a plurality of network elements by using a plurality of network management terminals, each of the plurality of network management terminals monitoring the plurality of network elements constituting a network and controlling the cross-connect at each of the plurality of network elements, comprising:
   instructing locking and unlocking of the cross-connect set in one of the plurality of network elements by only one of the plurality of network management terminals corresponding to a predetermined priority to said one of the plurality of network elements via an interface part; and
   controlling the instructed locking and unlocking of the set cross-connect in said one of the plurality of network elements by receiving a response from said one of the plurality of network elements via the interface part,
   wherein said instructing and controlling of the locking and unlocking are limited from any other of the plurality of network management terminals.

2. The cross-connect protection method as claimed in claim 1, wherein a specific network management terminal among the plurality of network management terminals instructs the locking and unlocking.

3. The cross-connect protection method as claimed in claim 1, wherein only a specific network management terminal user ID is allowed to perform an operation of instructing the locking and unlocking of a cross-connect set in one of the network elements from one of the network management terminals.

4. A cross-connect protection method of protecting a cross-connect each of a plurality of network elements by using a plurality of network management terminals, each of the plurality of network management terminals monitoring the plurality of network elements constituting a network and controlling the cross-connect at each of the plurality of network elements, comprising:
   adding a priority, by one of the plurality of network management terminals, to a set or cancel instruction which sets or cancels the cross-connect in one of the plurality of network elements; and
   setting, by said one of the plurality of network elements, the cross-connect with the added priority in a case of a set instruction, and canceling, by said one of the plurality of network elements, the cross-connect only when the added priority is equal to or higher than a priority of a set cross-connect in a case of a cancel instruction,
   wherein the added priority corresponds to the one of the plurality of network management terminals for instructing the cross-connect in relation to others of the plurality of network management terminals.

5. The cross-connect protection method as claimed in claim 4, wherein the priority is determined for each of the network management terminals beforehand.

6. The cross-connect protection method as claimed in claim 4, wherein the priority is determined for each network management terminal user ID beforehand.

7. A cross-connect protection method of protecting a cross-connect each of a plurality of network elements by using a plurality of network management terminals, each of the plurality of network management terminals monitoring the plurality of network elements constituting a network and controlling the cross-connect at each of the plurality of network elements, comprising
   adding a keyword, by one of the plurality of network management terminals, to a set or cancel instruction which sets or cancels the cross-connect in one of the plurality of network elements; and
   setting, by said one of the plurality of network elements, the cross-connect with the added keyword in a case of a set instruction, and canceling, by said one of the plurality of network elements, the cross-connect only when the added keyword matches a keyword of the cross-connect in a case of a cancel instruction,
   wherein the added keyword corresponds to the one of the plurality of network management terminals for instructing the cross-connect in relation to others of the plurality of other network management terminals.

8. A network element including a cross-connect, a control part that controls the cross-connect, and an interface part connected to one of a plurality of network management terminals that control a plurality of network elements constituting a network, the one of network management terminal controlling the cross-connect at each of the plurality of network elements, the control part comprising:
   a lock/unlock control part that receives a command from the one of the plurality of network management terminals instructing locking and unlocking of a set cross-connect, and performs the instructed locking by prohibiting canceling of the set cross-connect and the instructed unlocking by canceling the set cross-connect,
   wherein the one network management terminal corresponds to a predetermined priority in relation to others of the plurality of network management terminals, and
   said locking and unlocking of the set cross-connect are limited from the others of the plurality of network management terminals.

9. The network element as claimed in claim 8, comprising:
   a response returning part that returns a response which is added with information indicating locking/unlocking of a set cross-connect when a setting confirmation command is received from the network management terminals.

10. A network management terminal including an interface part connected to a network element via a transmission channel, and a control part that monitors a plurality of network elements constituting a network and controls a cross-connect at each of the plurality of network elements, the control part comprising:
   a priority adding part that adds a priority to a command for instructing setting or cancellation of the cross-connect in one of the plurality of network elements, and transmits said command to said one of the plurality of network elements, wherein the priority corresponds to the network management terminal in relation to a plurality of other network management terminals, and the setting and cancellation of the cross-connect are limited to corresponding commands with the added priority.

11. A network element of a system where a plurality of network management terminals monitor a plurality of network elements constituting a network and the cross-connect at each of said network elements is controlled, comprising:

a cross-connect setting/cancellation part that receives a command from one of said network management terminals, sets a cross-connect with an added priority in a case of a set instruction, and performs cancellation only when the added priority is equal to or higher than a priority of a set cross-connect in a case of a cancel instruction, wherein the added priority corresponds to the one of the plurality of network management terminals for instructing the cross-connect in relation to others of the plurality of other network management terminals.

* * * * *

UNITED STATES PATENT AND TRADEMARK OFFICE
CERTIFICATE OF CORRECTION

| | | |
|---|---|---|
| PATENT NO. | : 7,734,759 B2 | Page 1 of 1 |
| APPLICATION NO. | : 10/237226 | |
| DATED | : June 8, 2010 | |
| INVENTOR(S) | : Yuichi Nagahama | |

It is certified that error appears in the above-identified patent and that said Letters Patent is hereby corrected as shown below:

Title page, item (63) should read as follows:

-- (63)  Related U.S. Application Data

Continuation of application No. PCT/JP00/03364, filed on May 25, 2000. --

Signed and Sealed this

Seventeenth Day of August, 2010

David J. Kappos
*Director of the United States Patent and Trademark Office*